(12) United States Patent
Nakatsuka et al.

(10) Patent No.: US 6,542,449 B2
(45) Date of Patent: Apr. 1, 2003

(54) DISK DRIVE APPARATUS

(75) Inventors: Yoshiaki Nakatsuka, Osaka (JP); Yoshihiro Mushika, Neyagawa (JP); Hiroyuki Yamaguchi, Nishinomiya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 148 days.

(21) Appl. No.: 09/861,029

(22) Filed: May 18, 2001

(65) Prior Publication Data

US 2001/0043530 A1 Nov. 22, 2001

(30) Foreign Application Priority Data

May 18, 2000 (JP) ........................................ 2000-146538

(51) Int. Cl.⁷ .............................................. G11B 19/00
(52) U.S. Cl. ..................................................... 369/53.1
(58) Field of Search .............................. 369/53.1, 53.12, 369/53.18, 53.26; 340/517

(56) References Cited

U.S. PATENT DOCUMENTS 6,295,264 B1 * 9/2001 Kawakami .................. 369/75.1

FOREIGN PATENT DOCUMENTS

| JP | 04372731 | * 12/1992 |
| JP | 06028701 | * 2/1994 |
| JP | 08-255409 | 10/1996 |
| JP | 10255348 | * 9/1998 |
| JP | 11-185414 | 7/1999 |

* cited by examiner

*Primary Examiner*—William Korzuch
*Assistant Examiner*—Angel Castro
(74) *Attorney, Agent, or Firm*—Akin, Gump, Strauss, Hauer & Feld, L.L.P.

(57) ABSTRACT

The present invention aims to provide a disk drive apparatus in which a pickup is prevented from being overheated. The disk drive apparatus includes a motor for rotating a disk-shaped storage medium, a pickup for reading/writing information from/onto the storage medium, a rotation controller for controlling the rotational speed of the storage medium, and an overheat detector for detecting overheating of the pickup. The pickup is cooled by using an airflow entailed by the rotating storage medium. In the disk drive apparatus, when the overheat detector detects overheating of the pickup, the rotation controller increases the rotational speed of the storage medium, thereby increasing the efficiency of cooling the pickup.

24 Claims, 12 Drawing Sheets

DISK DRIVE APPARATUS

FIELD OF THE INVENTION

The present invention relates to a disk drive apparatus for reading/writing information from/onto a disk-shaped storage medium (hereinafter referred to simply as a "disk"), such as an optical disk, a magnetic disk, and a magneto-optical disk, by using a pickup. More particularly, the present invention relates to a disk drive apparatus capable of cooling the pickup.

BACKGROUND OF THE INVENTION

In recent years, there has been an increasing demand for reducing the power consumption of a disk drive apparatus, due to the growing popularity of portable equipment using a disk drive apparatus and in view of the environment protection. A significant factor, among others, that increases the power consumption of a disk drive apparatus is the power consumed by the motor (disk motor) for rotating the disk.

In order to reduce the power consumption of a disk motor, it is important to reduce the windage loss, i.e., the load of an airflow generated by the rotation of the disk. When the disk is rotated, airflow is generated in the vicinity of the disk surface because the air surrounding the disk surface moves together with the rotating disk. The air flow gives some air resistance on the rotating disk surface. Furthermore, the disk rotates while slightly wobbling up and down. Therefore, the rotating disk takes relatively large air resistance. As the rotating disk takes the load of the surrounding air (or an airflow), the disk motor also takes some load, which increases the power consumption of the disk motor. Therefore, in order to reduce the power consumption of the disk motor, it is important to reduce the windage, loss on the rotating disk. In order to reduce the windage loss, it is effective to reduce the rotational speed of the disk, for example.

One approach known in the art to minimize the rotational speed of the disk while sufficiently retaining the performance of the apparatus, such as the data transfer rate, is to employ a CLV (Constant Linear Velocity) method for controlling the rotational speed of the disk. In the CLV method, the rotational speed of the disk is lower when reading/writing data from/onto a region of the disk closer to the outer periphery thereof, and higher when reading/writing data from/onto a region of the disk closer to the inner periphery thereof. The CLV method is suitably used with disk drive apparatuses for performing continuous reading/writing operations with little seek operation, such as music CD players. DVD-RAM writing/reading apparatuses suitably employ a ZCLV (Zoned CLV) method, in which different disk rotational speeds are used for a plurality of zones that are defined on the disk surface at different distances from the center of the disk, respectively. With these methods, it is possible to read/write information at a predetermined data transfer rate irrespective of the position of the pickup on the disk. Moreover, since the disk is rotated at the lowest rotational speed required to obtain the predetermined data transfer rate, the power consumption of the disk motor can be reduced.

When the disk drive apparatus is not writing/reading information (i.e., during an idling period), the disk drive apparatus is typically put in a sleep mode (power save mode) to save the power consumption, since putting the disk drive apparatus in such a mode during an idling period has little effect on the performance thereof. Japanese Laid-Open Patent Publication No. 8-255409 discloses a method for efficiently reducing the power consumption of the motor by decreasing the rotational speed of the disk motor in two steps in the sleep mode. Thus, it is possible to save the power consumption of the disk drive apparatus by reducing the rotational speed of the disk motor when a read/write operation is not being performed.

Japanese Laid-Open Patent Publication No. 11-185414 discloses a magnetic disk drive apparatus in which the magnetic head (pickup) is moved away from the center of the disk when a read/write operation is not being performed in order to reduce the windage loss on the rotating disk. According to Japanese Laid-Open Patent Publication No. 11-185414, when the head is near the outer periphery of the disk, as compared to when it is near the center of the disk, the airflow generated by the rotation of the disk is less likely to be disturbed, whereby it is possible to reduce the windage loss and thus the power consumption of the disk motor.

The conventional magnetic disk drive apparatus disclosed in Japanese Laid-Open Patent Publication No. 11-185414 will now be described with respect to FIG. 12. FIG. 12 illustrates a head disk assembly (hereinafter referred to as an "HDA") of a magnetic disk drive apparatus 100 with a magnetic disk 101 loaded therein. The magnetic disk 101, as a storage medium, is secured on the rotating member of a spindle motor 102 by a disk clamp 103, so that the magnetic disk 101 is rotated by the rotation of the spindle motor 102.

The magnetic disk drive apparatus 100 includes a magnetic head 104 for writing information onto the magnetic disk 101. The magnetic head 104 is pivotally secured on a pivot 106 via a head arm 105. The magnetic head 104 can be moved substantially in the radial direction of the magnetic disk 101 by moving the head arm 105 by using a voice coil motor 112 including a coil section 107 and a magnetic circuit 108. The spindle motor 102, the pivot 106 and the magnetic circuit 108 are secured to a base 109.

The magnetic disk drive apparatus 100 rotates the magnetic disk 101 counterclockwise by driving the spindle motor 102. The rotation of the magnetic disk 101 generates an airflow 110 in a direction according to the rotation direction of the magnetic disk 101, as indicated by an arrow in FIG. 12.

While the disk is rotating, the magnetic head 104 is moved as necessary between the outer periphery and the inner periphery of the magnetic disk 101 by pivoting the head arm 105 about the pivot 106. When the magnetic head 104 is near the outer periphery of the magnetic disk 101, a gimbal 111 and the head arm 105 are outside the magnetic disk 101. In such a position, the gimbal 111 and the head arm 105 do not interfere with the passageway of the airflow 110 generated by the rotating magnetic disk 101, thereby reducing the windage loss.

When the magnetic head 104 is at a position within the disk area that is not near the outer periphery of the magnetic disk 101, the gimbal 111 and the head arm 105 as well as the magnetic head 104 are within the area of the magnetic disk 101, thereby narrowing the passageway of the airflow 110 generated by the rotating magnetic disk 101 and thus disturbing the airflow 110. As a result, the windage loss on the rotation of the magnetic disk 101 increases, thereby increasing the power consumption of the disk drive apparatus.

The operations of the magnetic head 104, the spindle motor 102, the voice coil motor 112 for moving the magnetic head 104, etc., are controlled by an upper-level device (not shown). The upper-level device outputs signal for controlling the operations of the magnetic head 104, the spindle motor 102, etc., so as to read/write information from/onto the magnetic disk 101. When the magnetic disk drive apparatus 100 receives a read command from the upper-level device, a seek operation is performed to move the magnetic head 104 to an intended track, and information is read by the magnetic head 104 from the intended track.

After completion of a read command, for example, the magnetic disk drive apparatus 100 performs a power saving operation as follows. If, after completion of the read command, the magnetic head 104 is on the inner periphery side with respect to a predetermined radial distance (e.g., a distance equal to two thirds of the radius of the magnetic disk 101) from the center of the magnetic disk 101, and if another command is not issued from the upper-level device within a predetermined period of time after the completion of the read command, then, the magnetic head 104 is moved to the outer periphery side of the magnetic disk 101 with respect to the predetermined radial distance. In order to effectively reduce the power consumption of the spindle motor 102, the magnetic head 104 can be moved as far as possible away from the center of the magnetic disk 101. In order to further reduce the power consumption, the magnetic head 104 can be moved away from the center of the magnetic disk 101 even if the magnetic head 104 is on the outer periphery side of the magnetic disk 101 with respect to the predetermined radial distance after completion of the read command.

As described above, by moving the pickup away from the center of the disk when a read/write operation is not being performed, it is possible to reduce the windage loss occurring while the disk is rotating, thereby reducing the power consumption of the disk drive apparatus.

However, when a power saving operation as described above is employed in order to reduce the power consumption of the disk drive apparatus, the temperature of the pickup (head) is likely to increase. As the rotational speed of the disk is decreased or the pickup is moved away from the center of the disk in order to reduce the disturbance of the airflow, the amount of airflow around the pickup entailed by the rotating disk is reduced, thereby reducing the air-cooling effect on the pickup.

When the temperature of the pickup exceeds an acceptable range, the performance of the pickup may be lowered, the operating life of the pickup may be shortened. In the case of an optical disk from/onto which information is read/written with laser beam, the temperature of a laser diode unit (hereinafter referred to also as an "LDU") or a laser diode driver (hereinafter referred to also as an "LDD") provided in the pickup for generating laser beam may increase to a very high temperature. The performance of an LDU is significantly lowered by overheating. Therefore, it is very important to prevent the pickup from being overheated. Accordingly, in many of such disk drive apparatuses in the prior art, the inside of the disk drive apparatus is cooled by air by using a cooling fan, or the like.

As described above, when one attempts to reduce the windage loss occurring while the disk is rotating in order to reduce the power consumption of the disk drive apparatus, the pickup is more likely to be overheated. Therefore, it has been difficult to reduce the windage loss on the disk while preventing the pickup from being overheated.

SUMMARY OF THE INVENTION

It is therefore an object of this invention to provide a disk drive apparatus capable of preventing a pickup from being overheated while minimizing the power consumption of the disk drive apparatus.

An inventive disk drive apparatus includes: a motor for rotating a disk-shaped storage medium; a pickup for performing at least one of a write operation of writing information onto the storage medium and a read operation of reading information from the storage medium; a rotation controller for controlling a rotational speed of the storage medium; and an overheat detector for detecting overheating of the pickup, wherein: the pickup is cooled by using an airflow generated by the rotation of the storage medium; and when the overheat detector detects overheating of the pickup, the rotation controller increases the rotational speed of the storage medium to perform an operation of increasing an efficiency of cooling the pickup.

Another inventive disk drive apparatus includes: a motor for rotating a disk-shaped storage medium; a pickup for performing at least one of a write operation of writing information onto the storage medium and a read operation of reading information from the storage medium; a pickup-moving device for moving the pickup between a center of rotation of the storage medium and an outer periphery of the storage medium; and an overheat detector for detecting overheating of the pickup, wherein: the pickup is cooled by using an airflow generated by the rotation of the storage medium; and when the overheat detector detects overheating of the pickup, the pickup-moving device moves the pickup toward the center of rotation of the storage medium to perform an operation of increasing an efficiency of cooling the pickup.

In a preferred embodiment, the overheat detector includes a temperature measuring device for measuring a temperature of the pickup.

In a preferred embodiment, the overheat detector includes a rotational speed detector for detecting a rotational speed of the storage medium, wherein overheating of the pickup is detected based on an output of the rotational speed detector.

In a preferred embodiment, the overheat detector further includes a timer for measuring a time duration for which the rotational speed of the storage medium is within a predetermined rotational speed range, wherein overheating of the pickup is detected based on the output of the rotational speed detector and an output of the timer.

In a preferred embodiment, the overheat detector includes a position detector for detecting a position of the pickup, wherein overheating of the pickup is detected based on an output of the position detector.

In a preferred embodiment, the overheat detector further includes a timer for measuring a time duration for which the position of the pickup is within a predetermined position range, wherein overheating of the pickup is detected based on the output of the position detector and an output of the timer.

In a preferred embodiment, the disk drive apparatus further includes a cartridge detector for determining whether the storage medium is connected to the motor while being accommodated in a cartridge.

In a preferred embodiment: when the cartridge detector determines that the storage medium is connected to the motor while being accommodated in the cartridge, an operation of increasing the efficiency of cooling the pickup is performed; and when the cartridge detector determines that the storage medium is connected to the motor while being not accommodated in the cartridge, an operation of increasing the efficiency of cooling the pickup is not performed.

In a preferred embodiment, when the pickup does not receive a control signal from an upper-level device for controlling the pickup to read information from the storage medium or write information onto the storage medium, an operation of increasing the efficiency of cooling the pickup is performed.

In a preferred embodiment: the overheat detector includes a position detector for detecting a position of the pickup; the storage medium is rotated while being accommodated in a cartridge having an opening; the pickup includes a heat generating portion; and when the position detector determines that a position of the heat generating portion of the pickup is outside the opening of the cartridge, the pickup-moving device moves the pickup toward the center of rotation of the storage medium.

In a preferred embodiment, the heat generating portion is a laser device.

In a preferred embodiment, when the overheat detector detects overheating of the pickup, the pickup-moving device moves the pickup to a vicinity of a position that is closest to the center of rotation of the storage medium within a range of motion of the pickup.

In a preferred embodiment: the storage medium includes a read/write region from or onto which information can be read or written; and when the overheat detector detects overheating of the pickup, the pickup-moving device moves the pickup to a vicinity of a position that is closest to the center of rotation of the storage medium within the read/write region of the storage medium.

Still another inventive disk drive apparatus includes: a motor for rotating a disk-shaped storage medium; a pickup for performing at least one of a write operation of writing information onto the storage medium and a read operation of reading information from the storage medium; a pickup-moving device for moving the pickup between a center of rotation of the storage medium and an outer periphery of the storage medium; a rotation controller for controlling a rotational speed of the storage medium based on a position of the pickup; and an overheat detector for detecting overheating of the pickup, wherein: the pickup is cooled by using an airflow generated by the rotation of the storage medium; and when the overheat detector detects overheating of the pickup, the pickup-moving device moves the pickup toward the center of rotation of the storage medium and the rotation controller increases the rotational speed of the storage medium to perform an operation of increasing an efficiency of cooling the pickup.

Still another inventive disk drive apparatus includes: a motor for rotating a disk-shaped storage medium; a pickup for performing at least one of a write operation of writing information onto the storage medium and a read operation of reading information from the storage medium; a rotation controller for controlling a rotational speed of the storage medium; a pickup-moving device for moving the pickup between a center of rotation of the storage medium and an outer periphery of the storage medium; and an overheat detector for detecting overheating of the pickup, wherein: the pickup is cooled by using an airflow generated by the rotation of the storage medium; and when the overheat detector detects overheating of the pickup, an operation of increasing an efficiency of cooling the pickup by the airflow is performed.

The term "pickup" as used herein refers to any device that can be moved across the surface of a disk while facing the disk so as to perform at least one of a write operation of writing information onto the disk and a read operation of reading information from the disk. The pickup as used herein may be a write-only pickup, a read-only pickup or a read/write pickup, and includes an optical device, a magnetic device, and an electric circuit, for example. In the case of an optical disk drive apparatus, the pickup (optical pickup) may include, for example, a laser diode unit for generating laser beam, a laser diode driver for driving the laser diode unit, and a head amplifier for amplifying, and converting into a voltage signal, an electric signal that is obtained by receiving and converting reflected laser beam from the disk. In the case of a magnetic disk drive apparatus, the pickup may, include, for example, a magnetic head for performing at least one of an operation of generating a magnetic field and an operation of detecting a magnetic field, and a head amplifier for amplifying an electric signal obtained by the detected magnetic field.

DESCRIPTION OF THE PREFERRED EMBODIMENTS

Preferred embodiments of the present invention will now be described with reference to the accompanying drawing. Like numerals indicate like parts and structural features in the various figures. In the following description, an optical disk drive apparatus for reading/writing information from/onto a DVD-RAM disk will be described. However, the disk drive apparatus of the present invention is not limited to such an optical disk drive apparatus, but may alternatively be an optical disk drive apparatus for reading information from a read-only optical disk such as a CD-ROM or a DVD-ROM, or a magneto-optical disk drive apparatus, for example.

Embodiment 1

Figure 1:
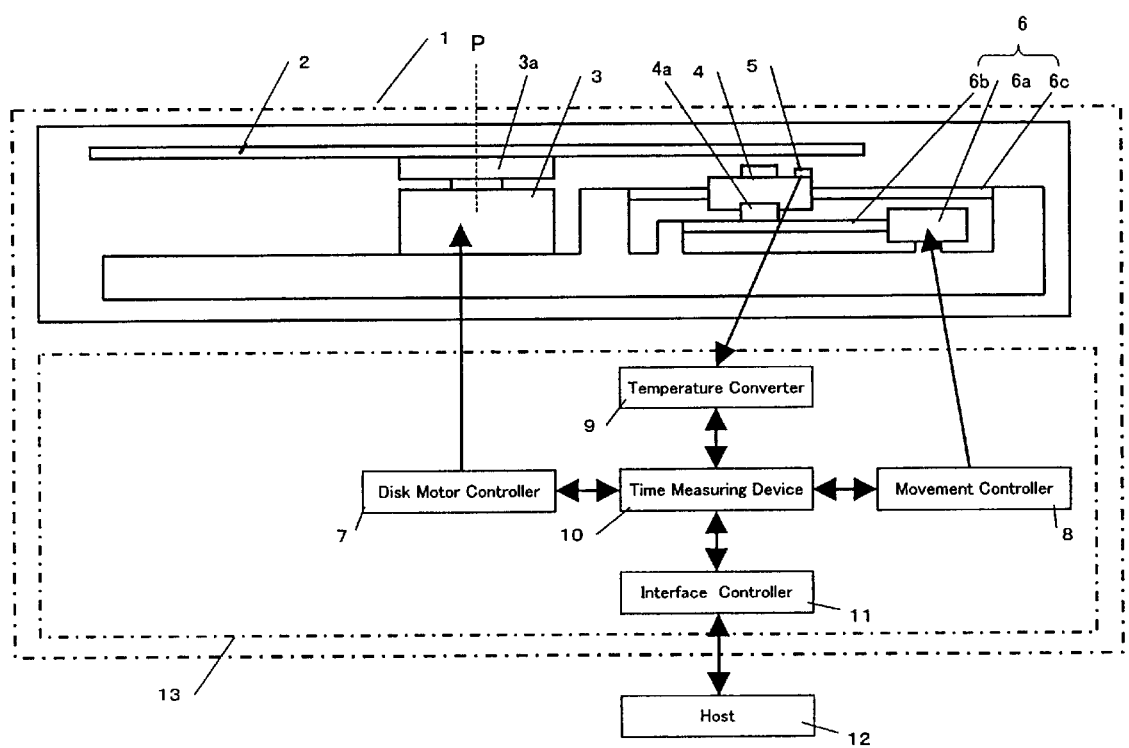
FIG. 1 is a diagram illustrating a configuration of a disk drive apparatus according to Embodiment 1 of the present invention.

FIG. 1 illustrates a configuration of an optical disk drive apparatus 1 according to Embodiment 1. The optical disk drive apparatus 1 includes a loading mechanism (not shown) for loading a DVD-RAM disk 2, and reads/writes information from/onto the DVD-RAM disk 2.

Figure 11:
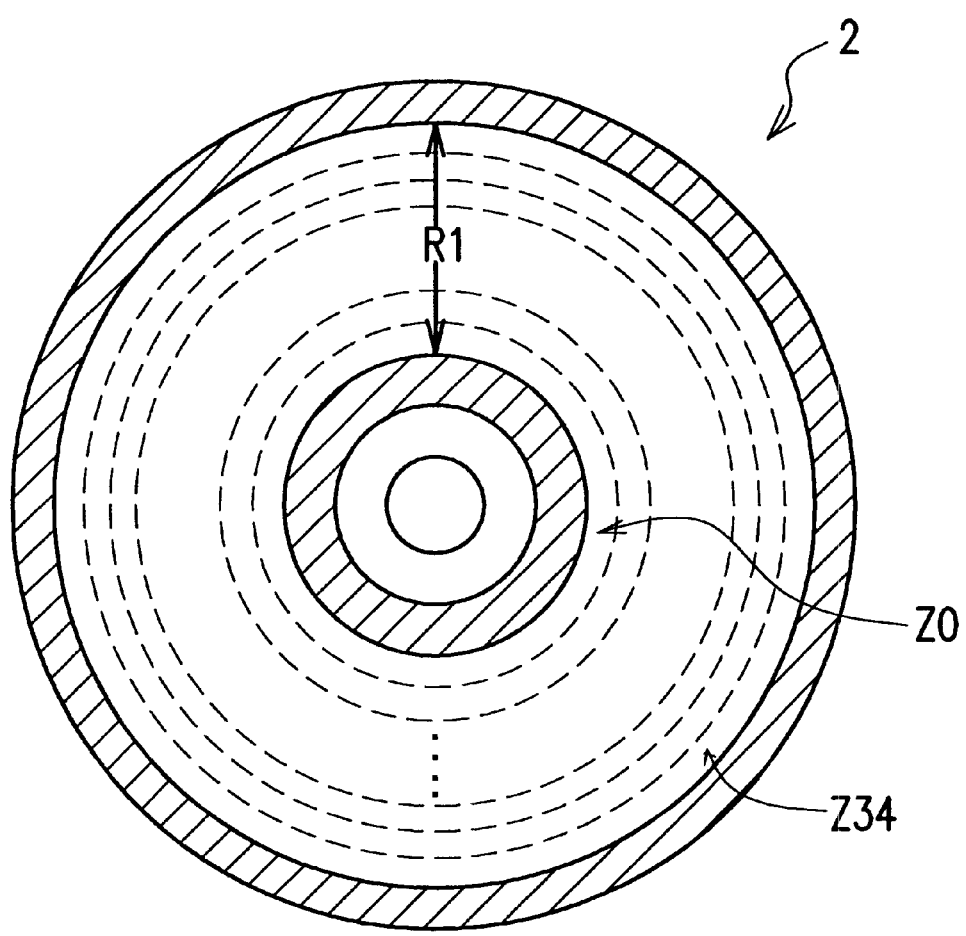
FIG. 11 is a plane view illustrating a DVD-RAM disk used in the present invention.
Figure 12:
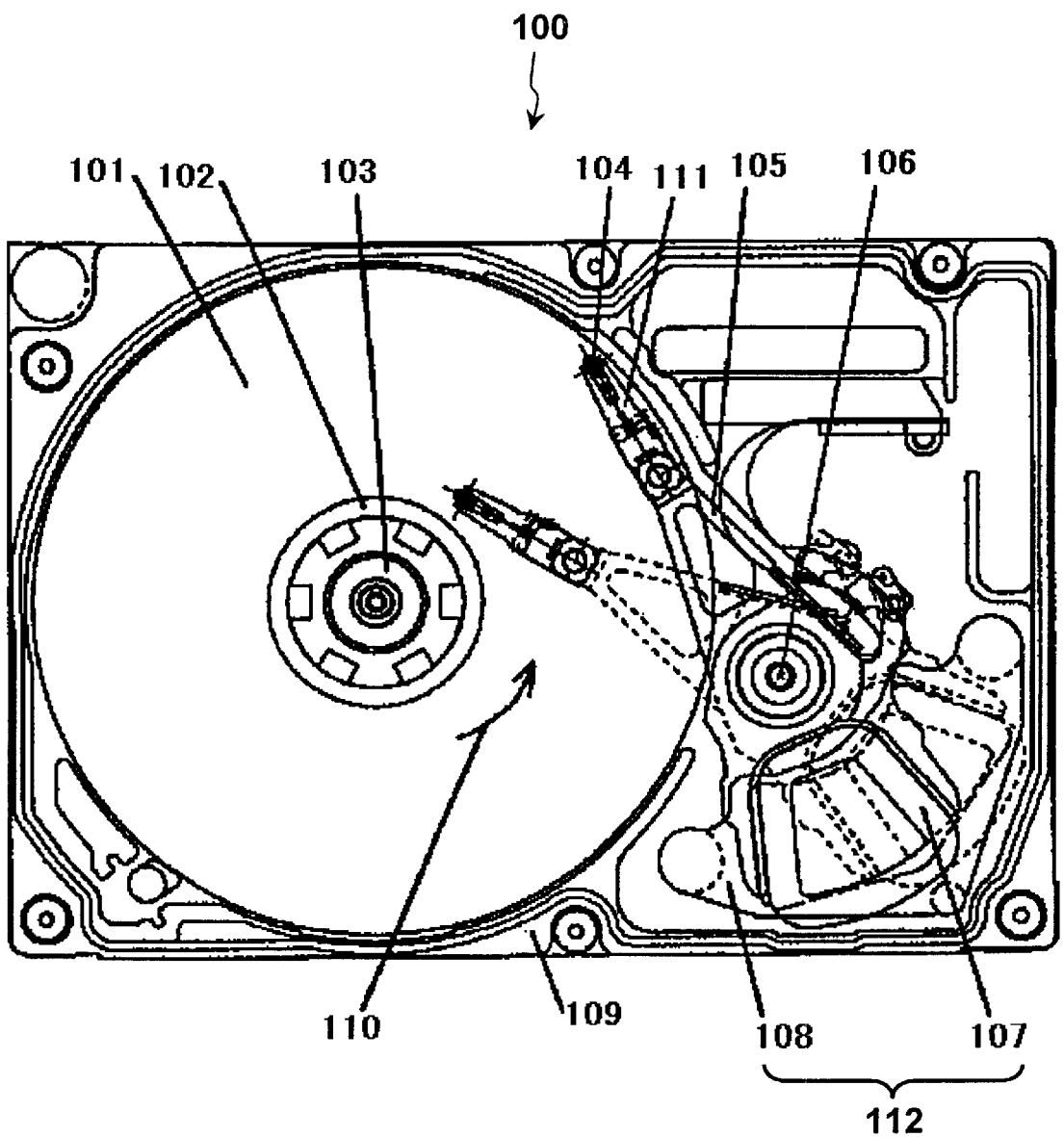
FIG. 12 is a plane view illustrating a conventional magnetic disk drive apparatus.

Before describing the optical disk drive apparatus 1, the DVD-RAM disk 2 will be described with reference to FIG. 11. As illustrated in FIG. 11, the DVD-RAM disk 2 includes a user area R1 having a capacity of 4.7 GB per side from/onto which information can be read/written. The user area R1 is divided into 35 zones that are designated as zone 0 (Z0) to zone 34 (Z34) starting from the inner periphery of the DVD-RAM disk 2. The DVD-RAM disk 2 is rotated by using the ZCLV method, so that the optical disk drive apparatus 1 changes the rotational speed of the DVD-RAM disk 2 (i.e., the rotational speed of the disk motor) for different zones. For example, the rotational speed of the disk motor is 3246.0 r/min (rotational frequency: 54.10 Hz) in the innermost zone (zone 0) and 1375.2 r/min (rotational frequency: 22.92 Hz) in the outermost zone (zone 34). Physical block addresses (hereinafter referred to as "PBAs") are sequentially assigned to the blocks of the DVD-RAM disk 2, starting from the inner periphery to the outer periphery of the DVD-RAM disk 2. The innermost block of the DVD-RAM disk 2 within the user area R1 is assigned a PBA "31000h". The character "h" at the end of the PBA indicates that "31000" is a hexadecimal expression.

Referring back to FIG. 1, the optical disk drive apparatus 1 includes a disk motor 3 for rotating the DVD-RAM disk 2. The DVD-RAM disk 2 is secured on a turntable 3a that is fixed to the rotor of the disk motor 3.

In the present embodiment, the disk motor 3 is provided with a Hall sensor for measuring magnetic changes caused by the rotation of the disk motor 3. The Hall sensor outputs a rotation detection signal of 6 pulses/revolution as the disk motor 3 is rotated. The rotational speed of the disk motor 3 (i.e., the rotational speed of the DVD-RAM disk 2) can be determined by detecting the rotation detection signal. The rotational speed of the disk motor 3 may alternatively be determined by any other method known in the art.

The optical disk drive apparatus 1 also includes a pickup 4 for reading/writing information from/onto the DVD-RAM disk 2 by irradiating the read/write surface of the DVD-RAM disk 2 with laser beam. The pickup 4 includes, among others, a laser device including a laser diode unit (LDU) for generating laser beam and a laser diode driver (LDD) for driving the LDU, and a head amplifier for amplifying, and converting into a voltage signal, an electric signal that is obtained by converting reflected laser beam from the DVD-RAM disk 2. The terms "laser device" as used herein generally includes an optical element, an electric circuit, and the like, used for generating laser beam.

The laser device and the head amplifier provided in the pickup 4 may generate heat during a read/write operation. This may lead to an overheated state of the pickup 4 (i.e., a state where the temperature of the pickup 4 is higher than a predetermined temperature). An increase in the temperature of the LDU is particularly undesirable. Therefore, in the present embodiment, the temperature of the LDU is controlled to be less than or equal to an acceptable temperature Ta as will be described later.

A thermistor 5 is provided in the vicinity of the LDU of the pickup 4. The thermistor 5 is a semiconductor device having a small heat capacity and whose resistance value substantially changes for a change in the temperature. Therefore, the thermistor 5 is suitably used in the pickup 4 as a temperature measuring device for detecting the temperature of the LDU. In this specification, the temperature of an element (e.g., LDD or LDU) of the pickup may be referred to as the "temperature of the pickup".

The optical disk drive apparatus 1 further includes a pickup-moving device 6 for moving the pickup 4 generally in the radial direction of the DVD-RAM disk 2. The pickup-moving device 6 uses a stepping motor 6a having a lead screw 6b therein, and the lead screw 6b is engaged with a threaded portion 4a of the pickup 4. A guide shaft 6c extending in the radial direction of the DVD-RAM disk 2 is inserted in a bore of the pickup 4, and the pickup 4 is moved generally in the radial direction of the DVD-RAM disk 2 by rotating the lead screw 6b. Moreover, the stepping motor 6a is provided with an encoder, and the rotational speed of the stepping motor 6a, or the travel distance of the pickup 4, can be determined based on the output from the encoder.

The pickup-moving device 6 is not limited to the above configuration, as long as it can move the pickup 4 between the center P of rotation and the outer periphery of the DVD-RAM disk 2.

The optical disk drive apparatus 1 includes an upper-level controller 13. The upper-level controller 13 includes a CPU, a DSP, a RAM, a ROM, and the like. The upper-level controller 13 controls the disk motor 3, the pickup-moving device 6, etc., based on a program and data that are pre-stored in the ROM. The upper-level controller 13 includes an interface controller 11 for exchanging commands and data with a host 12, a disk motor controller 7, a movement controller 8, a temperature converter 9, and a time measuring device 10.

The disk motor controller 7 drives and controls the disk motor 3. The disk motor controller 7 also has a function of determining the rotational speed of the disk motor 3 based on the rotation detection signal output from the Hall sensor provided in the disk motor 3.

The movement controller 8 drives and controls the pickup-moving device 6 so as to move the pickup 4 to an intended position. As described above, addresses are sequentially assigned to the surface of DVD-RAM disk 2, starting from the inner periphery to the outer periphery of the DVD-RAM disk 2. Thus, the position of the pickup 4 can be represented by the address of the area accessed by the pickup 4 at that position. Hereinafter the address of the area accessed by the pickup 4 is referred to as a "pickup address" and the "pickup address" may be used to represent the position of the pickup 4. The movement controller 8 also has a function of determining the rotational speed of the stepping motor 6a, or the travel distance of the pickup 4, based on the output from the encoder of the stepping motor 6a.

The temperature converter 9 converts the output of the thermistor 5 into temperature data to determine the temperature of the pickup 4. Since the resistance value vs. temperature relationship of the thermistor 5 is pre-defined, the temperature of the pickup 4 can be calculated based on the output from the thermistor 5. As described above, the temperature of the laser diode unit, among other elements of the pickup 4, is measured in the present embodiment. This is because it is important to control the temperature of the laser diode unit under a predetermined temperature since the performance of a laser diode unit is easily lowered by overheating.

The time measuring device 10 provided in the upper-level controller 13 is capable of measuring a time duration (period) based on the operating clock of the CPU, for example. The time measuring device 10 can measure an elapsed time from the reception of a reset signal from the disk motor controller 7 or the movement controller 8.

The optical disk drive apparatus 1 of the present embodiment is also capable of exchanging commands and data with the external host (upper-level device) 12 connected to the optical disk drive apparatus 1 via the interface controller 11 provided in the upper-level controller 13.

Figure 2:
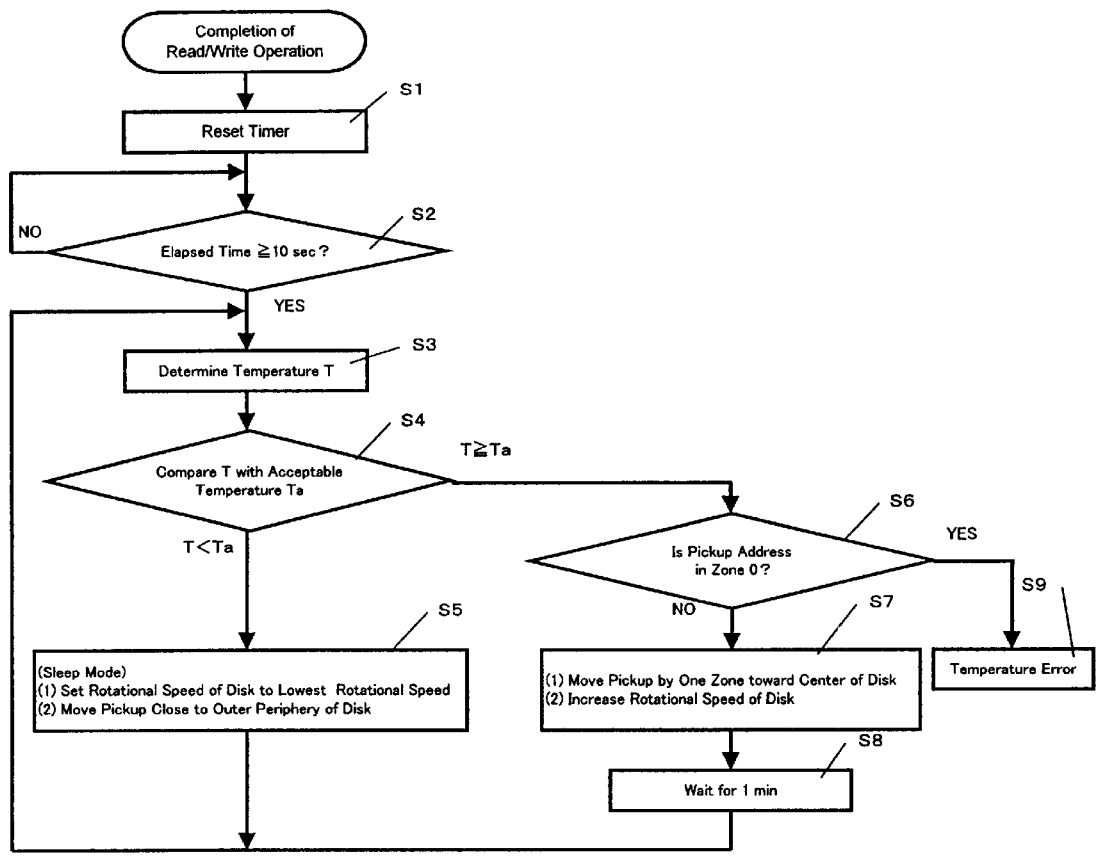
FIG. 2 is a flow chart illustrating the operation of the disk drive apparatus according to Embodiment 1 of the present invention.

Next, an exemplary operation of the optical disk drive apparatus 1 of the present embodiment will be described with reference to FIG. 2. In the operation to be described below, whether the pickup 4 is overheated is determined after completion of a read/write operation and before the optical disk drive apparatus 1 is allowed to transition to the sleep mode.

First, after completion of a read/write operation, the time measuring device 10 resets a timer to zero (S1), and starts measuring the elapsed time thereafter. Then, it is determined whether the elapsed time is equal to or greater than a predetermined time (10 seconds in the present embodiment) (S2). Step S2 is repeated until the elapsed time is equal to or greater than 10 seconds. Thus, in the present embodiment, the transition to the sleep mode is prohibited until the passage of 10 seconds from completion of the read/write operation. During this period, if the optical disk drive apparatus 1 receives a command for performing a read/write operation from the host 12, the optical disk drive apparatus 1 can promptly perform the read/write operation based on the received command.

If it is determined in step S2 that the elapsed time after completion of the read/write operation is equal to or greater than 10 seconds, the temperature converter 9 detects a temperature T of the pickup 4 based on the output from the thermistor 5 (S3). Then, the temperature T of the pickup 4 detected in step S3 is compared with the predetermined acceptable temperature Ta (S4).

In step S4, if the temperature T is less than the acceptable temperature Ta (T<Ta), it is determined that the pickup 4 is not overheated. In such a case, the optical disk drive apparatus 1 is allowed to transition to the sleep mode without performing the operation of cooling the pickup 4 (S5). In the sleep mode, the following two operations are performed.

First, the rotational speed of the DVD-RAM disk 2 is set to the lowest rotational speed pre-defined in the optical disk drive apparatus 1. Since, in the present embodiment, the rotational speed of the DVD-RAM disk 2 is controlled by the ZCLV method, the lowest rotational speed of the DVD-RAM disk 2 corresponds to the rotational speed that is used when performing a read/write operation on the outermost zone (zone 34) of the DVD-RAM disk 2. Specifically, the optical disk drive apparatus controls the disk motor 3 to rotate the DVD-RAM disk 2 at the rotational speed of 1375.2 r/min, which is assigned to zone 34.

Second, the pickup 4 is moved to zone 34, which is the outermost zone of the user area of the DVD-RAM disk 2. Zone 34 is located in the vicinity of the outer periphery of the DVD-RAM disk 2 having a radius of 60 mm, that is, within a radial position of 56.787 mm to 57.889 mm from the center of the DVD-RAM disk 2.

During the sleep mode, it is possible to reduce the power consumption of the disk motor 3 by lowering the rotational speed of the DVD-RAM disk 2. The power consumption of the disk motor 3 can be further reduced by positioning the pickup 4 close to the outer periphery of the DVD-RAM disk 2 to decrease the windage loss.

After the optical disk drive apparatus 1 has transitioned to the sleep mode in step S5, the process returns to step S3 to detect the temperature T of the pickup 4. This is done to check if the temperature T of the pickup 4 has not exceeded the acceptable temperature Ta after the transition to the sleep mode due to malfunctioning, an increase in an ambient temperature, etc. If T<Ta still holds in step S4, the sleep mode is retained.

If it is determined that the temperature T of the pickup 4 is equal to or greater than the acceptable temperature Ta (T≧Ta) in step S4, an operation of increasing the efficiency of cooling the pickup 4 is performed.

In this operation, first, it is determined whether the pickup address is within zone 0 (S6). Zone 0 is the innermost zone of the user area, and is within a radial position range of 24.101 mm to 24.964 mm from the center of the DVD-RAM disk 2. Under the ZCLV control, when the pickup address is within zone 0, the rotational speed of the DVD-RAM disk 2 is set to the highest rotational speed, i.e., 3246.0 r/min.

When the pickup address is not within zone 0 in step S6, it is determined that the pickup 4 can be moved further toward the center P of rotation of the DVD-RAM disk 2. Then, the pickup 4 is moved to a zone that is closer to the center P of rotation of the DVD-RAM disk 2 so as to improving the efficiency of cooling of the pickup 4 (S7). In this step, the following two operations are performed.

First, the pickup 4 is moved to the next zone closer to the center P of rotation of the DVD-RAM disk 2 by using the pickup-moving device 6. For example, when the pickup address is in zone 34, the pickup 4 is moved to the next zone closer to the center P of rotation of the DVD-RAM disk 2, i.e., zone 33. While the radial position range of zone 34 is 56.787 mm to 57.889 mm, that of zone 33 is closer to the center P of rotation of the DVD-RAM disk 2, i.e., 55.823 mm to 56.787 mm. Thus, as the pickup 4 is moved toward the center P of rotation of the DVD-RAM disk 2, the area of the pickup 4 that is exposed to the airflow generated by the rotation of the DVD-RAM disk 2 increases, thereby increasing the efficiency of cooling the pickup 4.

Second, the disk motor 3 is controlled to increase the rotational speed of the DVD-RAM disk 2 to a higher rotational speed (in this embodiment, a rotational speed that is assigned to the destination zone). For example, while the rotational speed assigned to zone 34 is 1375.2 r/min (rotational frequency: 22.92 Hz), that assigned to zone 33 is a greater value of 1399.2 r/min (rotational frequency: 23.32 Hz). The increase in the rotational speed of the DVD-RAM disk 2 also increases the amount of airflow that is generated by the rotation of the DVD-RAM disk 2, thereby increasing the efficiency of cooling the pickup 4.

Even if the efficiency of cooling the pickup 4 is increased in step S7, the temperature of the pickup 4 may not be reduced immediately, but there may be a time lag until the temperature of the pickup 4 actually starts decreasing. Therefore, a wait time of one minute is provided to wait for the pickup 4 to be cooled (S8). Then, the process returns to step S3 to again measure the temperature T of the pickup 4, after which the temperature T is compared with the acceptable temperature Ta in step S4.

If the temperature T of the pickup 4 has decreased below the acceptable temperature Ta, the optical disk drive apparatus 1 is allowed to transition to the sleep mode (S5) so as to reduce the power consumption of the optical disk drive apparatus 1.

If the temperature T of the pickup 4 is still equal to or greater than the acceptable temperature Ta, the pickup 4 is moved further toward the center P of rotation of the DVD-RAM disk 2 while further increasing the rotational speed of the DVD-RAM disk 2, as described above, so as to further increase the efficiency of cooling the pickup 4 by the airflow entailed by the rotating DVD-RAM disk 2 (S6–S8). Such a series of operations is repeated until the temperature T of the pickup 4 is less than the predetermined acceptable temperature Ta. After the temperature T of the pickup 4 has decreased below the predetermined acceptable temperature Ta, the optical disk drive apparatus 1 is allowed to transition to the sleep mode (S5) so as to reduce the power consumption.

If it is determined in step S6 that the pickup address is in zone 0, a temperature error is issued, terminating the series of operations (S9). This is done in order to protect the LDU when the optical disk drive apparatus 1 is inappropriately used at an unexpectedly high ambient temperature, for example.

Figure 3:
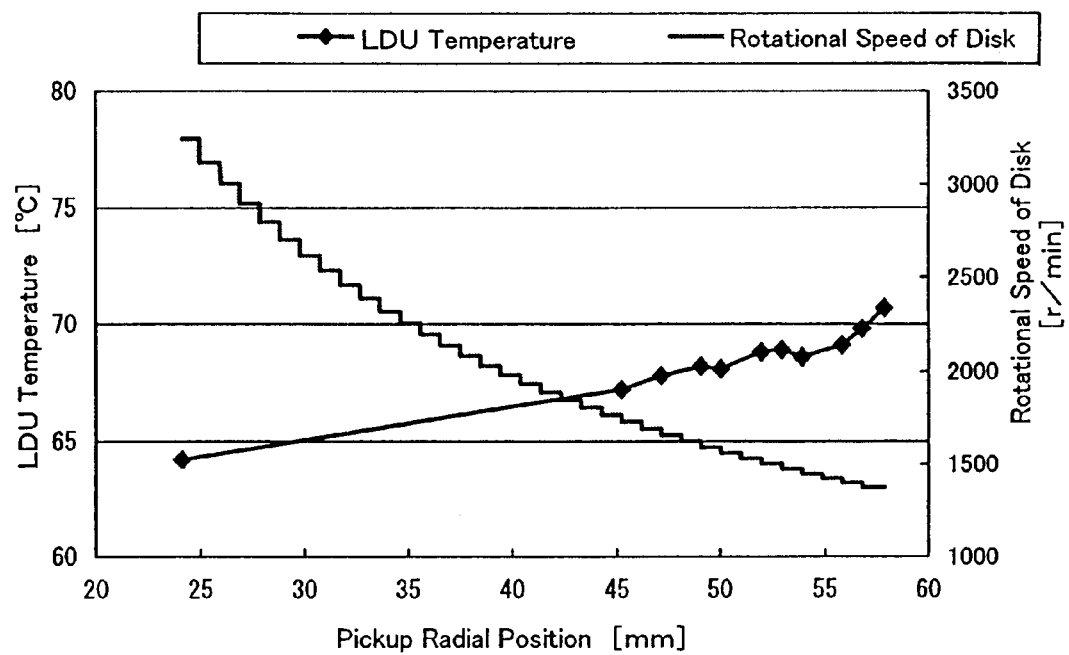
FIG. 3 illustrates the relationship between a pickup radial position and a rotational speed of a disk/LDU temperature.

FIG. 3 shows the relationship between the radial position of the pickup 4 (i.e., the distance from the center of rotation of the DVD-RAM disk 2 to the pickup 4) and the rotational speed of the DVD-RAM disk 2, and the relationship between the radial position of the pickup 4 and the temperature of the LDU, for the optical disk drive apparatus 1 idling at an ambient temperature of 45° C. Since the rotational speed of the disk motor 3 is controlled by the ZCLV method, as described above, the rotational speed of the DVD-RAM disk 2 changes in a stepwise manner, as illustrated in FIG. 3. The rotational speed of the DVD-RAM disk 2 is reduced as the pickup 4 is moved away from the center of the DVD-RAM disk 2. Conversely, the temperature of the LDU increases as the pickup 4 is moved away from the center of the DVD-RAM disk 2.

The temperature of the LDU changes depending upon the rotational speed of the DVD-RAM disk 2 and the position of the pickup 4. When the rotational speed of the DVD-RAM disk 2 is reduced as the pickup 4 is moved away from the center of the DVD-RAM disk 2 under the ZCLV control, the amount of airflow to which the pickup 4 is exposed is reduced, thereby lowering the efficiency of cooling the pickup 4. Accordingly, the temperature of the LDU increases. Moreover, as the pickup 4 is moved away from the center of the DVD-RAM disk 2, the area of the pickup 4 that is exposed to the airflow is also reduced, thereby lowering the cooling efficiency, and thus increasing the temperature of the LDU.

Therefore, when the pickup 4 is near the outer periphery of the pickup 4, it is possible to reduce the temperature of the LDU by increasing the rotational speed of the DVD-RAM disk 2 and moving the pickup 4 toward the center of the DVD-RAM disk 2, as can be seen from FIG. 3.

Next, an exemplary operation of the optical disk drive apparatus 1 will be described with reference to FIG. 3 for a case where the acceptable temperature Ta is 69° C. (Ta=69). When the ambient temperature is 45° C. and the radial position of the pickup 4 is 57.889 mm (in zone 34), the temperature T of the LDU is 70.7° C. (T=70.7). Thus, the temperature T is higher than the acceptable temperature Ta. On the other hand, when the radial position of the pickup 4 is about 55.823 mm (in zone 33), the temperature T of the LDU is 68.9° C. (T=68.9). Thus, the temperature T is less than the acceptable temperature Ta (T<Ta).

It can be seen from the above that the temperature T of the LDU becomes as high as 70.7° C. if the optical disk drive apparatus 1 is allowed to transition to the sleep mode after completion of the read/write operation, with the pickup 4 being move to the outermost zone, i.e., zone 34. Then, the temperature T of the LDU exceeds the acceptable temperature Ta. According to the present embodiment, however, the optical disk drive apparatus 1 can use the thermistor 5 and the temperature converter 9 to detect the overheating of the pickup 4. Then, the pickup 4 can be moved to the next zone closer to the center of the DVD-RAM disk 2, i.e., zone 33, thereby reducing the temperature T of the LDU to 68.9° C., which is less than the acceptable temperature Ta. In this way, the overheating of the pickup 4 can be eliminated. Then, if the temperature of the pickup 4 is less than or equal to the acceptable temperature Ta, the pickup 4 is returned to zone 34 to prevent the increase in the power consumption of the disk motor 3 due to the windage loss.

Thus, the operation of the optical disk drive apparatus 1 according to the present embodiment is controlled so that the pickup 4 does not exceed the acceptable temperature Ta while minimizing the power consumption. When the ambient temperature is so low that the temperature of the pickup 4 will not exceed the acceptable temperature even in the sleep mode, the optical disk drive apparatus 1 is kept in the sleep mode, thereby reducing the power consumption.

Where a DVD-RAM disk is rotated by the ZCLV method, to perform a seek operation including movement of a pickup to a different zone, it is necessary to change the rotational speed of the disk to a rotational speed that is assigned to the destination address. Such a seek operation increases the power consumption and promotes the heating of the disk motor 3 or the disk motor driver (a member of the disk motor controller 7). While the pickup 4 is moved to another zone in the present embodiment in order to increase the efficiency of cooling the pickup 4, the operation is a short-distance seek operation with a small increase in the rotational speed of the DVD-RAM disk 2 that is done within an instantaneous time period on the order of 10 milliseconds. Moreover, a wait time of one minute is provided after a seek operation toward the center of rotation of the DVD-RAM disk 2. Therefore, the influence of heating as described above is negligible.

As described above, the optical disk drive apparatus 1 of the present embodiment detects the temperature T of the pickup 4, and only when the temperature T of the pickup 4 exceeds the acceptable temperature Ta, the rotational speed of the disk motor 3 is increased or the pickup 4 is moved toward the center of rotation of the DVD-RAM disk 2, thus performing the operation of increasing the efficiency of cooling the pickup 4. Thus, it is possible to minimize the power consumption while preventing the pickup 4 from being overheated.

In the present embodiment, when the optical disk drive apparatus 1 transitions to the sleep mode, the rotational speed of the DVD-RAM disk 2 is set to 1375.2 r/min, which is assigned to zone 34, and the pickup 4 is moved to zone 34. Alternatively, the rotational speed of the DVD-RAM disk 2 may be set to a rotational speed less than 1375.2 r/min so as to further reduce the windage loss on the disk. This is more advantageous in terms of the power consumption. Moreover, the pickup 4 may be moved farther away from the center of rotation of the DVD-RAM disk 2 past zone 34 (e.g., to a position about 60 mm away from the center of the DVD-RAM disk 2) so as to further reduce the windage loss on the disk, thereby further reducing the power consumption. Furthermore, the power consumption can be further reduced by moving the pickup 4 beyond the outer periphery of the DVD-RAM disk 2 (to a position more than 60 mm away from the center of the DVD-RAM disk 2).

In the operation of increasing the efficiency of cooling the pickup, the rotational speed of the DVD-RAM disk 2 and the position of the pickup 4 can be controlled independently of each other, regardless of the correlation therebetween of the ZCLV method. Specifically, the rotational speed of the DVD-RAM disk 2 may be changed without moving the pickup 4, or the pickup 4 may be moved toward the center of rotation of the DVD-RAM disk 2 without changing the rotational speed of the DVD-RAM disk 2, so as to increase the efficiency of cooling the pickup 4.

In the present embodiment, when it is determined that the pickup 4 is overheated, the pickup 4 is moved toward the center of the DVD-RAM disk 2 by one zone at a time. Alternatively, the relationship between the radial position of the pickup 4 and the temperature T of the LDU, as illustrated in FIG. 3, may be pre-stored in the temperature converter 9 as a function. In such a case, the destination pickup address such that the temperature T of the LDU would be reduced to be less than or equal to the acceptable temperature Ta can be obtained based on the temperature T of the LDU and the current pickup address. Then, the pickup 4 can be moved to the destination pickup address. In this way, the pickup 4 can be cooled more quickly.

In the present embodiment, whether the pickup 4 is overheated is determined after completion of a read/write operation using the pickup 4 and before the transition to the sleep mode. Alternatively, whether the pickup 4 is overheated may be determined during the read/write operation. Since the optical disk drive apparatus 1 is capable of constantly measure the temperature T of the pickup 4 by using the thermistor 5, whether the pickup 4 is overheated can be determined even during a read/write operation. If it is determined that the pickup 4 is overheated during a read/write operation, the read/write operation can be temporarily paused to increase the rotational speed of the DVD-RAM disk 2 and/or move the pickup 4 toward the center of rotation of the DVD-RAM disk 2 so as to increase the efficiency of cooling the pickup 4.

Embodiment 2

Figure 4:
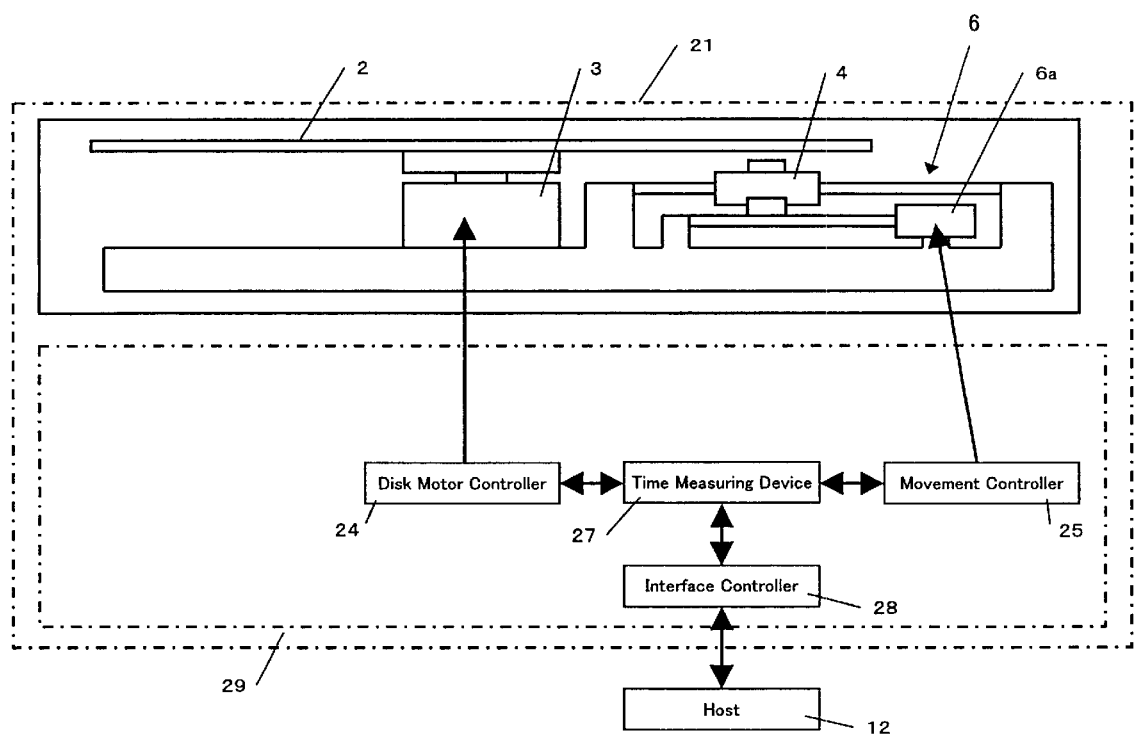
FIG. 4 is a diagram illustrating a configuration of a disk drive apparatus according to Embodiment 2 of the present invention.

FIG. 4 illustrates a configuration of an optical disk drive apparatus 21 of Embodiment 2. As compared to the optical disk drive apparatus 1 of Embodiment 1, the optical disk drive apparatus 21 of Embodiment 2 does not directly measure the temperature of the pickup 4 by using a temperature measuring device such as a thermistor, but indirectly detects overheating of the pickup 4 based on the information on the rotational speed of the disk motor 3 or the information on the position of the pickup 4. In this way, it is no longer necessary to provide a temperature measuring device as in the optical disk drive apparatus 1 of Embodiment 1, whereby it is possible to further simplify the configuration of the disk drive apparatus.

The DVD-RAM disk 2, the disk motor 3, the pickup 4, the pickup-moving device 6 and the host 12 illustrated in FIG. 4 are as those described above in Embodiment 1, and will not be further described below.

As illustrated in FIG. 4, the optical disk drive apparatus 21 includes an upper-level controller 29. The upper-level controller 29 includes a CPU, a DSP, a RAM, a ROM, and the like. The upper-level controller 29 controls the disk motor 3, the pickup-moving device 6, etc., based on a program and data that are pre-stored in the ROM. The upper-level controller 29 includes an interface controller 28 for exchanging commands and data with the host 12, a disk motor controller 24, a movement controller 25, and a time measuring device 27.

The disk motor controller 24 drives and controls the disk motor 3. The disk motor controller 24 also has a function of determining the rotational speed of the disk motor 3 based on the rotation detection signal output from the Hall sensor provided in the disk motor 3.

The movement controller 25 drives and controls the pickup-moving device 6 so as to move the pickup 4 to an intended position. The movement controller 25 also has a function of determining the rotational speed of the stepping motor 6a, or the travel distance of the pickup 4, based on the output from the encoder of the stepping motor 6a, which is provided in the pickup-moving device 6. Thus, the position of the pickup 4 is determined. Alternatively, the position of the pickup 4 may be detected based on the address read from the disk 2 by the pickup 4.

The time measuring device 27 is capable of measuring a time duration based on the operating clock of the CPU. The time measuring device 27 can measure an elapsed time from the reception of a reset signal from the disk motor controller 24 or the movement controller 25.

The interface controller 28 is capable of exchanging commands and data with the external host 12 connected to the optical disk drive apparatus 21.

Figure 5:
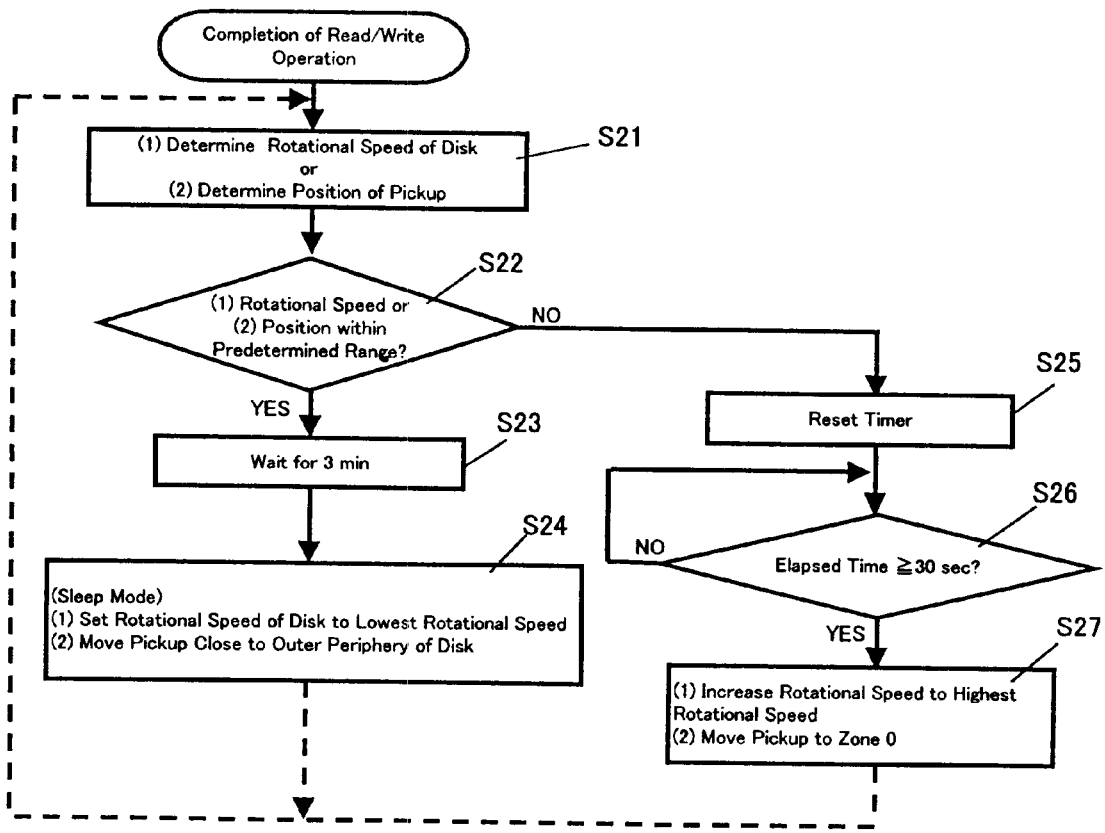
FIG. 5 is a flow chart illustrating the operation of the disk drive apparatus according to Embodiment 2 of the present invention.

Next, the operation of the optical disk drive apparatus 21 will be described with reference to FIG. 5. In the operation to be described below, whether the pickup 4 is overheated is determined after completion of a read/write operation and before the optical disk drive apparatus 21 is allowed to transition to the sleep mode.

After completion of a read/write operation, the disk motor controller 24 determines the rotational speed of the DVD-RAM disk 2 based on the rotation detection signal from the disk motor 3, or the movement controller 25 determines the position of the pickup 4 based on the output from the encoder of the pickup-moving device 6 (S21). The position of the pickup 4 may be determined by the address information read from the disk 2.

Then, it is determined whether the rotational speed of the disk motor 3 (i.e., the rotational speed of the DVD-RAM disk 2) or the position of the pickup 4 determined in step S21 is within a predetermined range (S22). More specifically, it is determined whether the rotational speed of the disk motor 3 is higher than a predetermined rotational speed or whether the position of the pickup 4 is closer to the center of the DVD-RAM disk 2 than a predetermined position. In step S22, whether the pickup 4 is overheated is determined based on the rotational speed of the DVD-RAM disk 2 or the position of the pickup 4.

As the rotational speed of the DVD-RAM disk 2 is higher or the pickup 4 is closer to the center of rotation of the DVD-RAM disk 2, the pickup 4 is in a state where it is effectively cooled by the airflow entailed by the rotating DVD-RAM disk 2. In such a case, it is expected that the temperature of the pickup 4 is sufficiently low after the passage of a predetermined time (e.g., 30 seconds) in the idling state, as illustrated in FIG. 3. In such a case, it is determined that the pickup 4 is not overheated.

In contrast, as the rotational speed of the DVD-RAM disk 2 is lower or the pickup 4 is farther away from the center of rotation of the DVD-RAM disk 2, the pickup 4 is in a state where it is not effectively cooled by the airflow entailed by the rotating DVD-RAM disk 2. In such a case, it is expected that the temperature of the pickup 4 will be excessively high after the passage of a predetermined time in the idling state. In such a case, it is determined that the pickup 4 is overheated.

If it is determined in step S22 that the pickup 4 is not overheated, the optical disk drive apparatus 21 is allowed to transition to the sleep mode after a wait time of 3 minutes (S23 and S24). The wait time of 3 minutes is provided in step S23 because even when it is determined in step S22 that the pickup 4 is in a state where it is effectively cooled (i.e., a state where the rotational speed of the DVD-RAM disk 2 is high or the position of the pickup 4 is close to the center of the DVD-RAM disk 2), the temperature of the pickup 4 at that moment may be quite high, in which case it is preferred to cool the pickup 4 for a predetermined period of time before allowing the optical disk drive apparatus 21 to transition to the sleep mode. Moreover, the optical disk drive apparatus 21 is prohibited from transitioning to the sleep mode immediately after completion of a read/write operation. Therefore, during the wait period, when another command is received from the host 12, the optical disk drive apparatus 21 can quickly perform another read/write operation based on the received command.

In the sleep mode (S24), after the passage of the wait time, one or both of the following two operations is/are performed. The first operation is to decrease the rotational, speed of the DVD-RAM disk 2 to the lowest rotational speed. In the present embodiment, the DVD-RAM disk 2 is rotated at the lowest rotational speed among the pre-defined rotational speeds for reading/writing information from/onto the DVD-RAM disk 2, i.e., 1375.2 r/min, which is assigned to zone 34. The second operation is to move the pickup 4 to the outermost zone of the user area of the DVD-RAM disk 2, i.e., zone 34. Zone 34 is located within a radial position range of 56.787 mm to 57.889 mm in the vicinity of the outer periphery of the DVD-RAM disk 2 having a radius of 60 mm. In this way, it is possible to reduce the windage loss occurring while the DVD-RAM disk 2 is rotating, and thus to reduce the power consumption of the optical disk drive apparatus 21.

In the present embodiment, the process returns to step S21 after the optical disk drive apparatus 21 transitions to the sleep mode in step S24. This is because in the sleep mode, the power consumption can be reduced but the effect of cooling the pickup 4 is small, whereby the temperature of the pickup 4 is likely to increase. In order to prevent the temperature of the pickup 4 from increasing excessively, it is preferred that whether the pickup 4 is overheated is determined by determining the position of the pickup 4 even after the optical disk drive apparatus 21 has transitioned to the sleep mode. For example, in the present embodiment, the pickup 4 is moved to the zone that is closest to the outer periphery of the DVD-RAM disk 2 in the sleep mode, whereby it is always determined in step S22 that the pickup 4 is overheated after determining the position of the pickup 4 again in step S21. In such a case, the optical disk drive apparatus 21 operates to reduce the temperature of the pickup 4, and after reducing the temperature of the pickup 4, the optical disk drive apparatus 21 is allowed to transition to the sleep mode again, as will be described below. In this way, the pickup 4 is periodically cooled during the sleep mode, whereby it is possible to appropriately prevent overheating of the, pickup 4 while minimizing the power consumption of the optical disk drive apparatus 21.

Where it is certain that the pickup 4 will not be overheated during the sleep mode, the sleep mode may be retained until the next read/write command is received, so as to most efficiently save the power consumption of the optical disk drive apparatus 21.

When it is determined in step S22 that the rotational speed of the disk motor 3 is lower than the predetermined rotational speed or that the position of the pickup 4 is farther away from the center of the DVD-RAM disk 2 than the predetermined position, the time measuring device 27 resets a timer to zero (S25), and starts measuring the elapsed time thereafter. Then, it is determined whether the elapsed time is equal to or greater than 30 seconds (S26).

When it is determined in step S26 that the elapsed time is less than 30 seconds, step S26 is repeated until the elapsed time is equal to or greater than 30 seconds. Thus, increasing the efficiency of cooling the pickup 4 is prohibited for 30 seconds. During this period of time, when the optical disk drive apparatus 21 receives a read/write command from the host 12, the optical disk drive apparatus 21 can quickly perform another read/write operation based on the received command.

In the present embodiment, an expected temperature of the pickup 4 which would result after the optical disk drive apparatus 21 idles for the predetermined time (30 seconds) is previously obtained for each rotational speed of the DVD-RAM disk 2 and for each position of the pickup 4 in the idling state. As illustrated in FIG. 3, the expected temperature of the pickup 4 is higher as the rotational speed of the DVD-RAM disk 2 is lower and/or as the pickup 4 is farther away from the center of the DVD-RAM disk 2, whereas the expected temperature of the pickup 4 is lower as the rotational speed of the DVD-RAM disk 2 is higher and/or as the pickup 4 is closer the center of the DVD-RAM disk 2. Therefore, by determining whether the rotational speed of the DVD-RAM disk 2 is lower than a predetermined rotational speed and/or whether the position of the pickup 4 is farther away from the center of the DVD-RAM disk 2 than a predetermined position, it is possible to determine whether the pickup 4 will exceed a predetermined highest acceptable temperature after the passage of the predetermined time. Thus, by determining in step S22 whether the rotational speed of the DVD-RAM disk 2 or the position of the pickup 4 is within a predetermined range, it is possible to detect overheating of the pickup 4. As described above, in the present embodiment, overheating of the pickup 4 is detected by determining the rotational speed of the DVD-RAM disk 2 or the position of the pickup 4 by using the disk motor controller 24 or the movement controller 25 and by measuring, with the time measuring device 27, the time duration for which the rotational speed of the DVD-RAM disk 2 or the position of the pickup 4, determined by the disk motor controller 24 or the movement controller 25, is retained.

When it is determined in step S26 that the elapsed time is equal to or greater than 30 seconds (when the predetermined time has elapsed), the following two operations are performed. First, the pickup 4 is moved to zone 0, i.e., PBA 31000h to PBA 398DFh (radial position range: 24.101 mm to 24.964 mm). Such a movement increases the area of the pickup 4 that is exposed to the airflow entailed by the rotating DVD-RAM disk 2, thereby increasing the efficiency of cooling the pickup 4 (particularly, the LDU). Second, the rotational speed of the DVD-RAM disk 2 is increased to 3246.0 r/min (the highest rotational speed), which is assigned to zone 0. The increase in the rotational speed of the DVD-RAM disk 2 increases the amount of airflow entailed by the rotating DVD-RAM disk 2 to which the pickup 4 is exposed, thereby increasing the efficiency of cooling the pickup 4.

After moving the pickup 4 to zone 0 in step S27, the process returns to step S21. Then, after it is determined in step S22 that the pickup 4 is not overheated and after the pickup 4 is sufficiently cooled for 3 minutes in step S23, the optical disk drive apparatus 21 is allowed to transition to the sleep mode.

As described above, according to the present embodiment, it is possible to expect the temperature of the pickup 4 which would result after the passage of the predetermined time by determining the position of the pickup 4 or the rotational speed of the disk motor 3 without providing a temperature measuring device such as a thermistor. In this way, it is possible to provide a disk drive apparatus capable of optimizing the power consumption and the pickup temperature by indirectly detecting overheating of the pickup based on the rotational speed of the disk motor, the position of the pickup. In the present embodiment, information on changes in the ambient temperature, and the like, is not obtained. Nevertheless, the temperature of the pickup 4 can be suppressed to be less than or equal to the highest acceptable temperature as long as the optical disk drive apparatus 21 is used within a prescribed temperature range, for which the normal operation of the optical disk drive apparatus 21 is warranted.

Where a high priority is given to preventing the pickup 4 from being overheated, the optical disk drive apparatus 21 may be allowed to transition to the sleep mode only when it is determined in the overheat detecting step (step S22) that the pickup 4 is in the innermost zone, i.e., zone 0. In such a case, if the pickup 4 is in any zone other than zone 0 after completion of a read/write operation, it is determined in step S22 that the pickup 4 is overheated. Then, the pickup 4 is moved to zone 0 in step S27. Thereafter, the process returns to step S21. In step S22, it is determined that the pickup 4 is not overheated, and therefore the process proceeds to step S23 to cool the pickup 4 for 3 minutes. When the pickup 4 is in zone 0 after completion of a read/write operation, the pickup 4 is not moved to anywhere from zone 0, and is cooled for 3 minutes in Step S23. In this way, after completion of a read/write operation, the pickup 4 is always moved to zone 0, regardless of the position of the pickup 4, so that the pickup 4 is always cooled at the highest cooling efficiency for a predetermined period of time. Therefore, it is possible to appropriately prevent the pickup 4 from being overheated.

Embodiment 3

Figure 6:
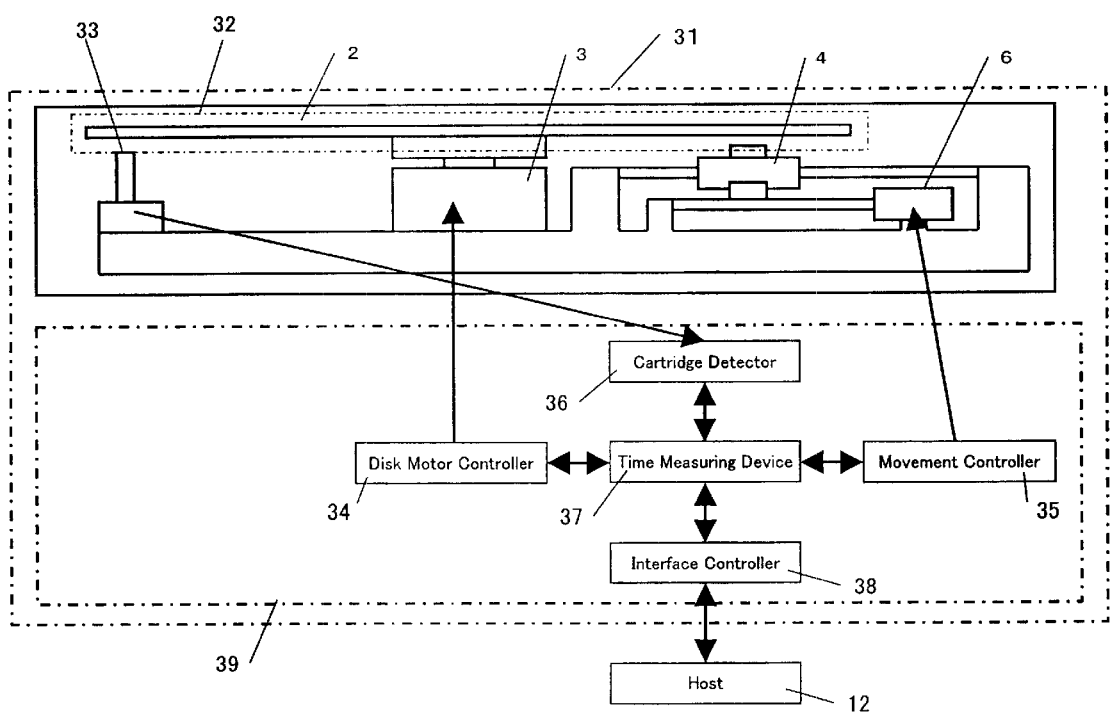
FIG. 6 is a diagram illustrating a configuration of a disk drive apparatus according to Embodiment 3 of the present invention.

FIG. 6 illustrates a configuration of an optical disk drive apparatus 31 according to Embodiment 3. A main difference between the optical disk drive apparatus 31 of the present embodiment and the optical disk drive apparatus 21 of Embodiment 2 is that the former can be used with the DVD-RAM disk 2 being accommodated in a cartridge 32.

The DVD-RAM disk 2, the disk motor 3, the pickup 4, the pickup-moving device 6, the host 12, etc., illustrated in FIG. 6 are as those described above in Embodiments 1 and 2, and will not be further described below.

The optical disk drive apparatus 31 includes a loading mechanism (not shown) capable of loading a DVD-RAM disk whether it is accommodated in a cartridge or not.

The optical disk drive apparatus 31 includes a cartridge detection switch 33. When a disk accommodated in the cartridge 32 is inserted in the optical disk drive apparatus 31, the cartridge detection switch 33 is pushed, and turned ON, by the cartridge 32. When the disk is not accommodated in the cartridge 32, or when the disk itself is not inserted, the cartridge detection switch 33 is not pushed, and is therefore OFF.

The optical disk drive apparatus 31 includes an upper-level controller 39. The upper-level controller 39 includes a CPU, a DSP, a RAM, a ROM, etc. The upper-level controller 39 controls the disk motor 3, the pickup-moving device 6, etc., based on a program and data that are pre-stored in the ROM. The upper-level controller 39 includes an interface controller 38 for exchanging commands and data with the host 12, a disk motor controller 34, a movement controller 35, a time measuring device 37, and a cartridge detector 36.

The disk motor controller 34 drives and controls the disk motor 3. The disk motor controller 34 also has a function of determining the rotational speed based on the rotation detection signal output from the disk motor 3.

The movement controller 35 drives and controls the pickup-moving device 6 to move the pickup 4 to an intended pickup address. The movement controller 25 also has a function of determining the rotational speed of the disk motor 3, or the travel distance of the pickup 4, based on the output from the encoder of the stepping motor, which is provided in the pickup-moving device 6.

The cartridge detector 36 determines whether the loaded DVD-RAM disk 2 is accommodated in the cartridge 32 by determining whether the cartridge detection switch 33 is ON or OFF.

The time measuring device 37 is capable of measuring a time duration based on the operating clock of the CPU. The time measuring device 37 can measure an elapsed time from the reception of a reset signal from the disk motor controller 34 or the movement controller 35.

Moreover, the interface controller 38 is capable of exchanging commands and data with the external host 12 connected to the optical disk drive apparatus 31.

Figure 7:
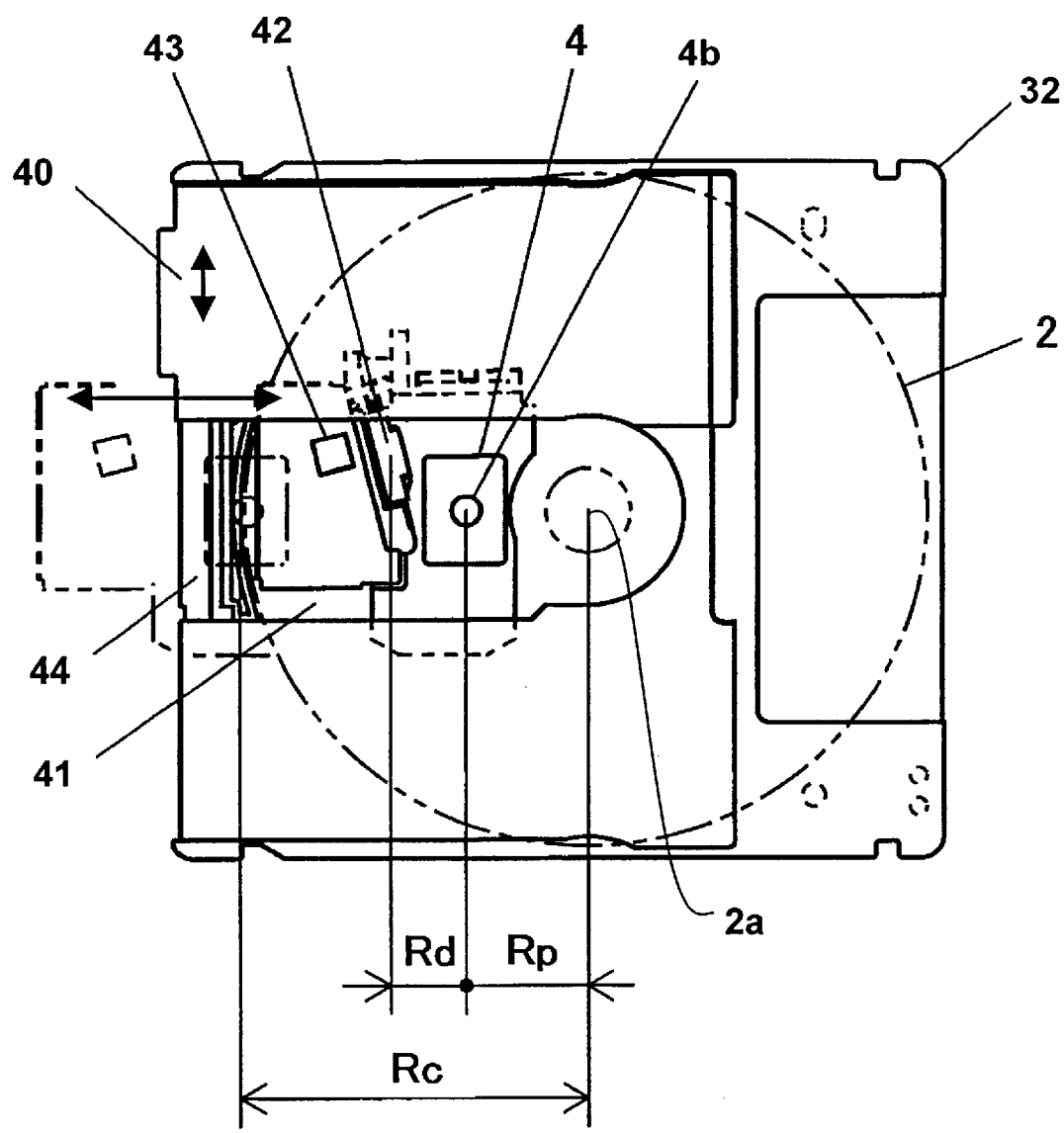
FIG. 7 is a diagram illustrating the positional relationship between a pickup and a cartridge according to Embodiment 3 of the present invention.

FIG. 7 is a plane view illustrating the positional relationship between the DVD-RAM disk 2 accommodated in the cartridge 32 and the pickup 4. The cartridge 32 includes a shutter 40 for opening/closing an opening 41. The opening 41 is provided so as to extend from a connecting member 44, which is provided to reinforce the edge of the cartridge 32, toward the center of the DVD-RAM disk 2. When the cartridge 32 is not inserted in the optical disk drive apparatus 31, the shutter 40 is closed, thereby protecting the read/write surface of the DVD-RAM disk 2. When the cartridge 32 is inserted in the disk drive apparatus 31, the shutter 40 is opened by a loading mechanism (not shown) provided in the disk drive apparatus 31. Thus, the read/write surface of the DVD-RAM disk 2 is exposed via the opening 41.

When performing a read/write operation, the pickup 4 is moved so that an object lens 4b, provided in the pickup 4 for focusing laser beam spot onto the DVD-RAM disk 2, is within the opening 41. The pickup 4 can be moved substantially in the radial direction of the DVD-RAM disk 2. The object lens 4b faces the read/write surface of the DVD-RAM disk 2 via the opening 41 and is in close proximity to the read/write surface. The object lens 4b focuses a spot of laser beam onto a predetermined address of the DVD-RAM disk 2 so as to read/write information from/onto the DVD-RAM disk 2. The pickup 4 includes laser devices such as an LDU 42 and an LDD 43, a head amplifier (not shown), etc. These laser devices and the head amplifier may generate heat during a read/write operation.

Herein, a "pickup radial position Rp" is defined as the distance between a center 2a of the DVD-RAM disk 2 and the object lens 4b. Moreover, an "LDU-object lens distance Rd" is defined as the distance between the object lens 4b and the LDU 42 in the direction in which the pickup 4 is moved. Furthermore, an "opening edge distance Rc" is defined as the distance between the center 2a and the outer edge of the opening 41. The radial position of the LDU 42, i.e., the distance from the center 2a to the LDU 42 (hereinafter referred to as the "LDU distance"), is expressed by the sum "Rp+Rd" of the pickup radial position Rp and the LDU-object lens distance Rd. In the present embodiment, when the pickup 4 is moved across the user area, the pickup radial position Rp varies from 24.101 mm to 57.889 mm (24.101≦Rp≦57.889). Moreover, the LDU-object lens distance Rd is 13.2 mm (Rd=13.2), and the opening edge distance Rc is 60.8 mm (Rc=60.8).

When the pickup 4 (or the object lens 4b) is at a position closest to the center 2a within the user area (Rp=24.101), the LDU distance Rp+Rd is 37.301 mm (Rp+Rd=37.301). In this case, the relationship Rp+Rd<Rc holds. Thus, the LDU 42 is within the opening 41. When the pickup 4 is at a position farthest away from the center 2a within the user area (Rp=57.889), the LDU distance Rp+Rd is 71.089 mm (Rp+Rd=71.089). Therefore, the relationship Rp+Rd>Rc holds. Thus, the LDU 42 is outside the opening 41, i.e., outside the cartridge 32.

Figure 8:
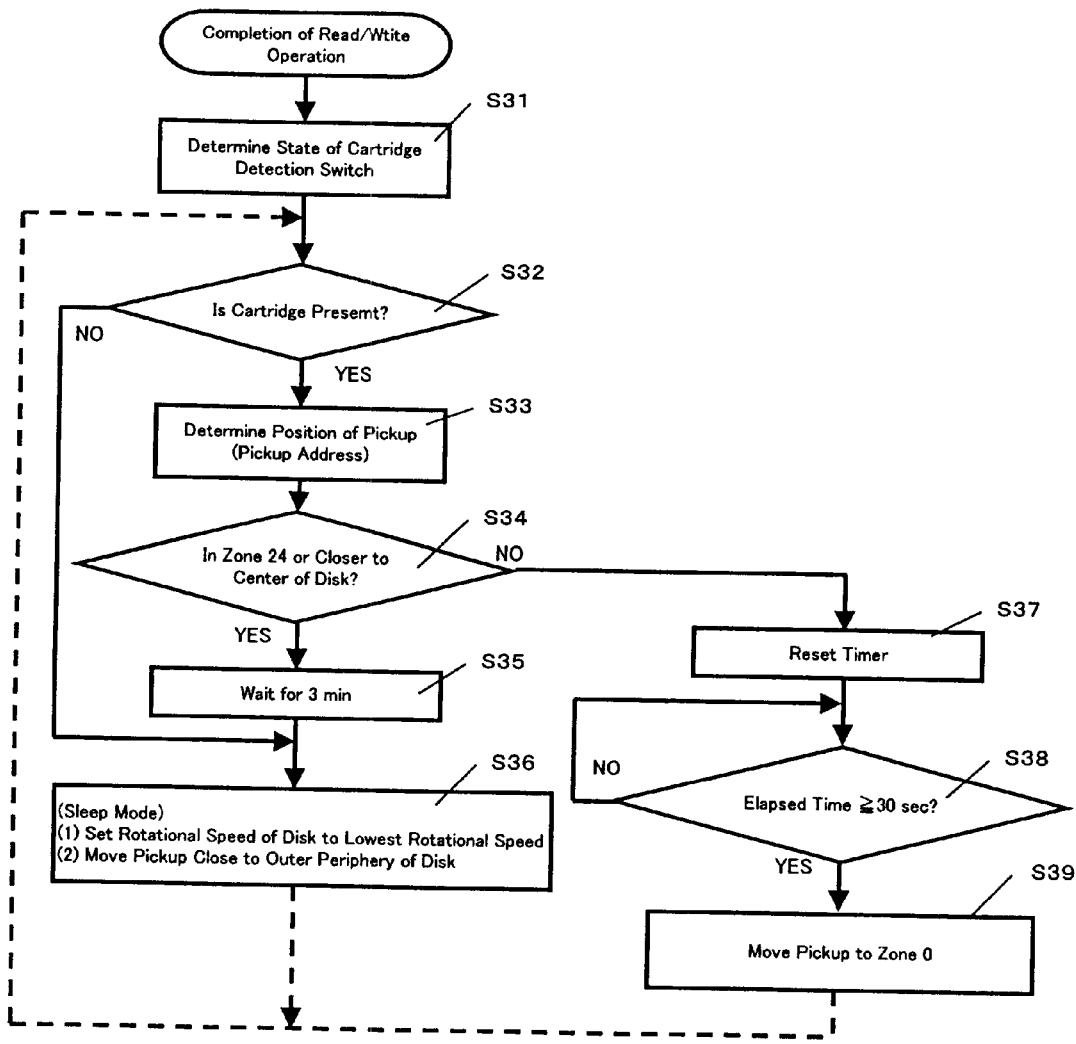
FIG. 8 is a flow chart illustrating the operation of the disk drive apparatus according to Embodiment 3 of the present invention.

Next, the operation of the disk drive apparatus 31 will be described with reference to FIG. 8. In the operation to be described below, whether the pickup 4 is overheated is determined after completion of a read/write operation and before the optical disk drive apparatus 31 is allowed to transition to the sleep mode.

After completion of a read/write operation, the cartridge detector 36 determines the ON/OFF state of the cartridge detection switch 33 (S31) so as to determine whether the cartridge 32 is present (S32). When the cartridge 32 is not present, the heat generated by the pickup 4, the disk motor 3, etc., is not blocked by the cartridge 32 and thus is effectively stirred by the airflow entailed by the rotating DVD-RAM disk 2, whereby there is a relatively small increase in the temperature of the pickup 4. Therefore, in such a case, the disk drive apparatus 31 is immediately allowed to transition to the sleep mode (S36). When the DVD-RAM disk 2 is not accommodated in the cartridge 32, the sleep mode is always retained so as to reduce the power consumption.

If it is determined in step S32 that the cartridge 32 is present, the movement controller 25 determines the position of the pickup 4 (i.e., the radial position of the object lens 4b) based on the output from the encoder of the stepping motor or based on the address information read from the disk 2 (S33).

Then, it is determined whether the position of the pickup 4 (pickup address) determined in step S33 is in zone 24 or any other zone on the disk surface that is closer to the center of the DVD-RAM disk 2 than zone 24 (S34). The determination is made with respect to zone 24 in order to determine whether the LDU 42 is within the opening 41. The LDU 42 is a member of the pickup 4 that may generate heat and is a member that particularly requires temperature control.

When the pickup address is in zone 24, the difference between the opening edge distance Rc and the LDU-object lens distance Rd, i.e., 47.6 mm (Rc—Rd=47.6), is generally equal to the pickup radial position Rp. In zone 24, the pickup address is in the range of PBA 17F5F0h to PBA 19212Fh (radial position: 47.144 mm to 48.108 mm). Therefore, when the pickup 4 is in a zone that is farther away from the center of the DVD-RAM disk 2 than zone 24, the LDU 42 is outside the opening 41. Where the disk motor 3 is rotated under the ZCLV control, the rotational speed of the disk motor 3 in zone 24 is 1656.0 r/min (rotational frequency: 27.60 Hz).

When it is determined in step S34 that the pickup address is in zone 24 or any other zone that is closer to the center of the DVD-RAM disk 2 than zone 24, it is determined that the pickup 4 is not overheated. Then, a wait time of 3 minutes is provided (S35) as in Embodiment 2, after which the disk drive apparatus 31 is allowed to transition to the sleep mode (S36). In the sleep mode, the following two operations are performed. First, the rotational speed of the DVD-RAM disk 2 is set to the lowest rotational speed of 1375.2 r/min, assigned to zone 34, among those pre-defined for reading/writing information from/onto the DVD-RAM disk 2. Second, the pickup 4 is moved to the outermost zone of the DVD-RAM disk 2, i.e., zone 34. Zone 34 is located within a radial position range of 56.787 mm to 57.889 mm in the vicinity of the outer periphery of the DVD-RAM disk 2 having a radius of 60 mm.

In the present embodiment, the process returns to step S32 after the optical disk drive apparatus 31 transitions to the sleep mode in step S36. As in Embodiment 2, this is done in order to effectively prevent the pickup 4 from generating heat after the transition to the sleep mode.

When it is determined in step S34 that the pickup address is not in zone 24 or any other zone that is closer to the center of the DVD-RAM disk 2 than zone 24, the time measuring device 37 resets a timer to zero (S37), and starts measuring the elapsed time thereafter. Then, it is determined whether the elapsed time is equal to or greater than 30 seconds (S38).

When it is determined in step S38 that the elapsed time is less than 30 seconds, step S38 is repeated until the elapsed time is equal to or greater than 30 seconds. In other words, the operation of increasing the efficiency of cooling the pickup 4 is prohibited for 30 seconds.

When it is determined in step S38 that the elapsed time is equal to or greater than 30 seconds, the pickup 4 is moved to zone 0 (S39). After moving the pickup 4 to zone 0, the LDU 42, which is a heat-generating member of the pickup 4, will be within the opening 41, whereby the LDU 42 can be effectively cooled by the airflow entailed by the rotating DVD-RAM disk 2. Where the rotational speed of the DVD-RAM disk 2 is controlled by the ZCLV method, the operation of increasing the rotational speed of the DVD-RAM disk 2 to the maximum rotational speed is also performed at the same time. This increases the amount of airflow entailed by the rotating DVD-RAM disk 2, thereby more effectively cooling the LDU 42.

In the present embodiment, when the LDU 42 is outside the opening 41, it is determined that the pickup 4 is overheated and the pickup 4 is moved toward the center of the DVD-RAM disk 2. Alternatively, whether the pickup 4 is overheated may be determined based on the position of any other heat-generating member of the pickup 4 (e.g., the LDD 43). For example, where the LDD 43 and the LDU 42 are provided close to each other, the heat generation by the LDD 43 may also heat the LDU 42. In such a case, the LDD 43 should be cooled in order to appropriately prevent the LDU 42 from being overheated. Therefore, in such a case, the pickup 4 may be moved toward the center of the DVD-RAM disk 2 when the LDD 43, a heat-generating member, is outside the opening 41.

After performing the operation, of increasing the efficiency of cooling the pickup 4 as described above, the process returns to step S32 to continue the operation of prevent the pickup 4 from being overheated while minimizing the power consumption, as in Embodiment 2.

Figure 9:
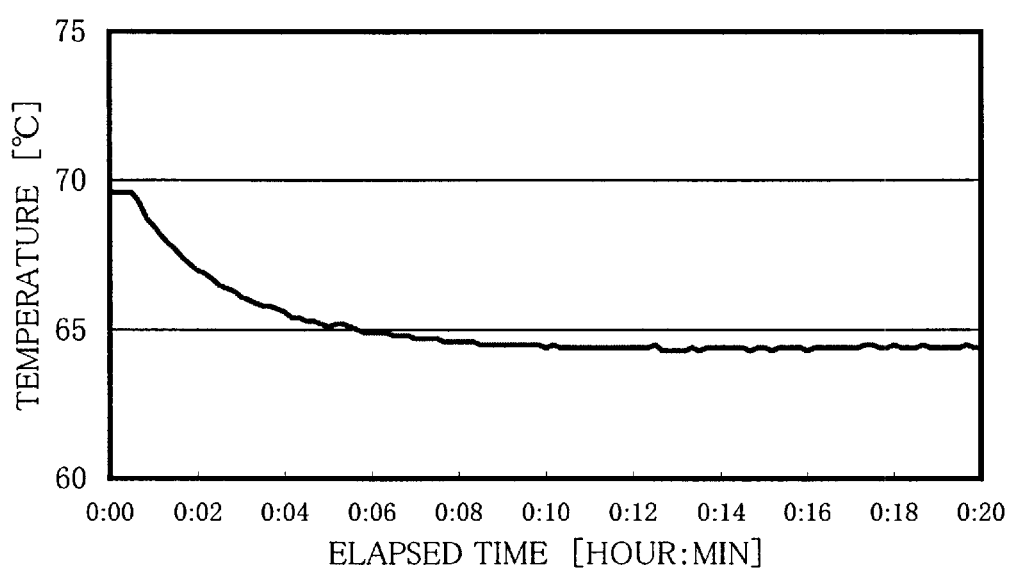
FIG. 9 illustrates a reduction in the temperature of an LDU according to Embodiment 3 of the present invention.

FIG. 9 illustrates a reduction in the temperature of the LDU 42 at an ambient temperature of 45° C. More specifically, FIG. 9 illustrates the transition of the temperature of the LDU 42 when the pickup 4 is moved from the outermost area of the DVD-RAM disk 2 to the innermost area of the DVD-RAM disk 2. As can be seen from FIG. 9, the temperature is reduced by about 4° C. in 3 minutes, and by about 5° C. in 9 minutes. While a wait time of 3 minutes is provided in step S35 in the present embodiment, a sufficient wait time (20 minutes or more) is provided in FIG. 9.

In the present embodiment, as in Embodiment 2, the expected temperature of the pickup 4 which would result after the passage of a predetermined period of time is obtained based on the position of the pickup 4. In this way, it is possible to prevent the pickup 4 from being overheated by indirectly detecting overheating of the pickup 4 based on the information on the position of the pickup 4 without directly measuring the temperature of the pickup 4.

Moreover, the operation of increasing the efficiency of cooling the pickup 4 is performed only when the cartridge 32 is present so that heat generated in the disk drive apparatus 31 is likely to be retained therein. Therefore, when using a bare disk such as a CD-ROM or a DVD-ROM, with which the heat is not likely to be retained in the disk drive apparatus 31, it is possible to reduce the power consumption by allowing the disk drive apparatus 31 to transition to the sleep mode without performing the operation of increasing the efficiency of cooling the pickup 4.

In the sleep mode of the present embodiment described above, the ON/OFF state of the cartridge detection switch 33 is determined after completion of a read/write operation. However, once the ON/OFF state is determined when the DVD-RAM disk 2 is loaded in the disk drive apparatus 31 by the loading mechanism (not shown), the ON/OFF state will not be changed until the DVD-RAM disk 2 is ejected from the disk drive apparatus 31. Therefore, it is not necessary to repeatedly detect the presence/absence of the cartridge 32.

In the present embodiment, the efficiency of cooling the pickup 4 is increased by moving the pickup 4 to the innermost area (zone 0) of the user area (read/write area where information can be read/written) of the DVD-RAM disk 2 in step S39. In such a case, since the pickup 4 is within the user area, when the next command for reading/writing information from/onto the DVD-RAM disk 2 is received from the host 12, the disk drive apparatus 31 can immediately perform the operation. Especially when a command for reading/writing information from/onto an area close to the center of the DVD-RAM disk 2 is received, the operation can be performed quickly.

However, where a high priority is given to preventing the pickup 4 from being overheated, the pickup 4 may be moved in step S39 to a position that is closer to the center of the DVD-RAM disk 2 than zone 0 in the user area. Typically, a lead-in area storing the management information of the disk is provided on a DVD-RAM disk at a position closer to the center of the DVD-RAM disk than zone 0, and the pickup can be moved up to the lead-in area. In such a case, the pickup can be moved to the lead-in area so that the pickup is more exposed to the airflow entailed by the rotating DVD-RAM disk, thereby effectively cooling the pickup.

Embodiment 4

Figure 10:
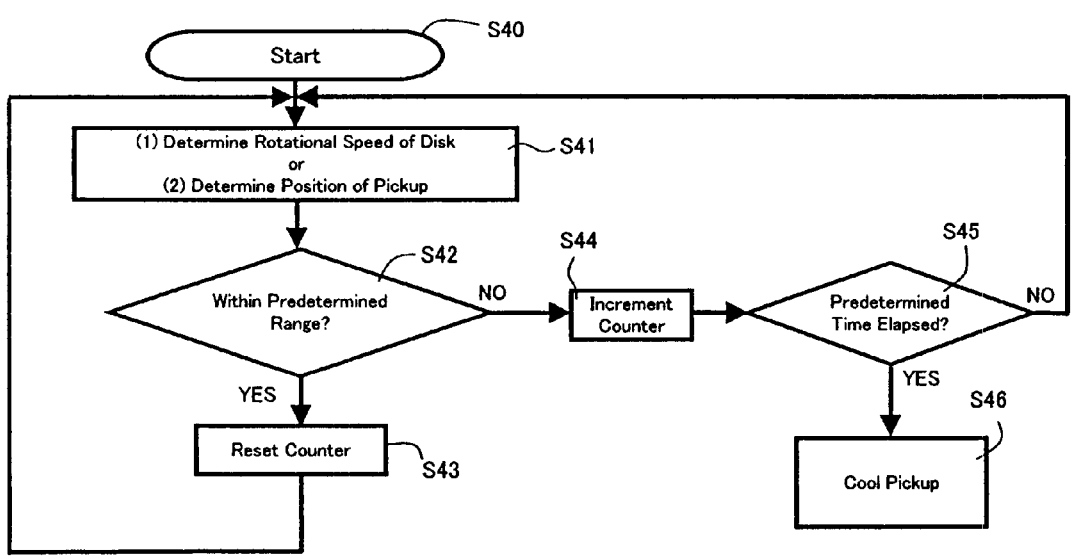
FIG. 10 is a flow chart illustrating the operation of a disk drive apparatus according to Embodiment 4 of the present invention.

FIG. 10 illustrates the operation of a disk drive apparatus according to Embodiment 4. In the present embodiment, whether the pickup 4 is overheated is determined during a read/write operation by the disk drive apparatus, not during an idling period before the transition to the sleep mode. The disk drive apparatus of the present embodiment is as that of Embodiment 2 illustrated in FIG. 4, and will not be described below.

Referring to FIG. 10, a read/write operation starts at step S40. Then, the rotational speed of the DVD-RAM disk 2 or the position of the pickup 4 is determined by using the disk motor controller 24 (see FIG. 4) or the movement controller 25 (see FIG. 4) (S41). Then, it is determined whether the rotational speed of the DVD-RAM disk 2 or the position of the pickup 4 is within a predetermined range (S42). More specifically, it is determined whether the rotational speed of the DVD-RAM disk 2 is higher than a predetermined rotational speed or whether the position of the pickup 4 is closer to the center of the DVD-RAM disk 2 than a predetermined position.

When it is determined that the rotational speed of the DVD-RAM disk 2 or the position of the pickup 4 is within the predetermined range, the pickup 4 is unlikely to be overheated. In such a case, the counter of the time measuring device 27 is reset (S43), and the rotational speed of the DVD-RAM disk 2 or the position of the pickup 4 is determined again (S41). In the present embodiment, the disk drive apparatus may receive a read/write command from the host 12 while determining whether the pickup 4 is overheated, and the rotational speed of the DVD-RAM disk 2 or the position of the pickup 4 may change substantially as a result of performing a read/write operation according to the command.

When it is determined in step S42 that the rotational speed of the DVD-RAM disk 2 or the position of the pickup 4 is not within the predetermined range, it is determined that the pickup 4 is likely to be overheated. Nevertheless, the performance of the pickup 4 will not deteriorate if the state where the pickup 4 is likely to be overheated continues only for a short period of time. In view of this, the value of the counter provided in the time measuring device 27 is incremented (S44), and it is determined whether the counter value has exceeded a predetermined value (S45) so as to determine whether the state where the pickup 4 is likely to be overheated has continued for a period of time longer than the predetermined (acceptable) period of time.

When it is determined in step S45 that the predetermined period of time has not elapsed, the process returns to step S41 to determine the rotational speed of the DVD-RAM disk 2 or the position of the pickup 4 again. Then, if it is determined in step S42 that the pickup 4 is in a state where it is likely to be overheated based on the rotational speed of the DVD-RAM disk 2 or the position of the pickup 4 determined in step S41, the counter of the time measuring device 27 is further incremented. Then, it is determined whether the updated counter value has exceeded the predetermined value in step S45.

In this way, it is possible to monitor whether the state where the pickup 4 is likely to be overheated has continued for a long period of time by continuously determining the rotational speed of the DVD-RAM disk 2 or the position of the pickup 4 during a read/write operation. When it is determined in step S45 that the counter value has exceeded the predetermined value, thereby detecting overheating of the pickup 4, the read/write operation is temporarily paused to perform the operation of increasing the efficiency of cooling the pickup 4 by increasing the rotational speed of the DVD-RAM disk 2 or moving the pickup 4 toward the center of rotation of the DVD-RAM disk 2 as described above. Thus, it is possible to appropriately prevent the pickup 4 from being overheated.

According to the present invention, when overheating of the pickup is detected, the rotational speed of the disk is increased or the pickup is moved toward the center of rotation of the disk so as to increase the efficiency of cooling the pickup by the airflow entailed by the rotating disk. Therefore, it is possible to appropriately protect the pickup.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

We claim:

1. A disk drive apparatus, comprising:
   a motor for rotating a disk-shaped storage medium;
   a pickup for performing at least one of a write operation of writing information onto the storage medium and a read operation of reading information from the storage medium;
   a rotation controller for controlling a rotational speed of the storage medium; and
   an overheat detector for detecting overheating of the pickup, wherein:

the pickup is cooled by using an airflow generated by the rotation of the storage medium; and when the overheat detector detects overheating of the pickup, the rotation controller increases the rotational speed of the storage medium to perform an operation of increasing an efficiency of cooling the pickup.

2. The disk drive apparatus according to claim 1, the overheat detector comprising a temperature measuring device for measuring a temperature of the pickup.

3. The disk drive apparatus according to claim 1, the overheat detector comprising a rotational speed detector for detecting a rotational speed of the storage medium, wherein overheating of the pickup is detected based on an output of the rotational speed detector.

4. The disk drive apparatus according to claim 3, the overheat detector further comprising a time measuring device for measuring a time duration for which the rotational speed of the storage medium is within a predetermined rotational speed range.

5. The disk drive apparatus according to claim 1, the overheat detector comprising a position detector for detecting a position of the pickup, wherein overheating of the pickup is detected based on an output of the position detector.

6. The disk drive apparatus according to claim 5, the overheat detector further comprising a time measuring device for measuring a time duration for which the position of the pickup is within a predetermined position range.

7. The disk drive apparatus according to claim 1, further comprising a cartridge detector for determining whether the storage medium is connected to the motor while being accommodated in a cartridge.

8. The disk drive apparatus according to claim 7, wherein:
when the cartridge detector determines that the storage medium is connected to the motor while being accommodated in the cartridge, an operation of increasing the efficiency of cooling the pickup is performed; and
when the cartridge detector determines that the storage medium is connected to the motor while being not accommodated in the cartridge, an operation of increasing the efficiency of cooling the pickup is not performed.

9. The disk drive apparatus according to claim 1, wherein when the pickup does not receive a control signal from an upper-level device for controlling the pickup to read information from the storage medium or write information onto the storage medium, an operation of increasing the efficiency of cooling the pickup is performed.

10. A disk drive apparatus, comprising:
a motor for rotating a disk-shaped storage medium;
a pickup for performing at least one of a write operation of writing information onto the storage medium and a read operation of reading information from the storage medium;
a pickup-moving device for moving the pickup between a center of rotation of the storage medium and an outer periphery of the storage medium; and
an overheat detector for detecting overheating of the pickup, wherein:
the pickup is cooled by using an airflow generated by the rotation of the storage medium; and
when the overheat detector detects overheating of the pickup, the pickup-moving device moves the pickup toward the center of rotation of the storage medium to perform an operation of increasing an efficiency of cooling the pickup.

11. The disk drive apparatus according to claim 10, the overheat detector comprising a temperature measuring device for measuring a temperature of the pickup.

12. The disk drive apparatus according to claim 10, the overheat detector comprising a rotational speed detector for detecting a rotational speed of the storage medium, wherein overheating of the pickup is detected based on an output of the rotational speed detector.

13. The disk drive apparatus according to claim 12, the overheat detector further comprising a time measuring device for measuring a time duration for which the rotational speed of the storage medium is within a predetermined rotational speed range.

14. The disk drive apparatus according to claim 10, the overheat detector comprising a position detector for detecting a position of the pickup, wherein overheating of the pickup is detected based on an output of the position detector.

15. The disk drive apparatus according to claim 14, the overheat detector further comprising a time measuring device for measuring a time duration for which the position of the pickup is within a predetermined position range.

16. The disk drive apparatus according to claim 10, further comprising a cartridge detector for determining whether the storage medium is connected to the motor while being accommodated in a cartridge.

17. The disk drive apparatus according to claim 16, wherein:
when the cartridge detector determines that the storage medium is connected to the motor while being accommodated in the cartridge, an operation of increasing the efficiency of cooling the pickup is performed; and
when the cartridge detector determines that the storage medium is connected to the motor while being not accommodated in the cartridge, an operation of increasing the efficiency of cooling the pickup is not performed.

18. The disk drive apparatus according to claim 10, wherein when the pickup does not receive a control signal from an upper-level device for controlling the pickup to read information from the storage medium or write information onto the storage medium, an operation of increasing the efficiency of cooling the pickup is performed.

19. The disk drive apparatus according to claim 10, wherein:
the overheat detector comprises a position detector for detecting a position of the pickup;
the storage medium is rotated while being accommodated in a cartridge having an opening;
the pickup includes a heat generating portion; and
when the position detector determines that a position of the heat generating portion of the pickup is outside the opening of the cartridge, the pickup-moving device moves the pickup toward the center of rotation of the storage medium.

20. The disk drive apparatus according to claim 19, wherein the heat generating portion is a laser device.

21. The disk drive apparatus according to claim 10, wherein when the overheat detector detects overheating of the pickup, the pickup-moving device moves the pickup to a vicinity of a position that is closest to the center of rotation of the storage medium within a range of motion of the pickup.

22. The disk drive apparatus according to claim 10, wherein:
the storage medium includes a read/write region from or onto which information can be read or written; and when the overheat detector detects overheating of the pickup, the pickup-moving device moves the pickup to a vicinity of a position that is closest to the center of rotation of the storage medium within the read/write region of the storage medium.

23. A disk drive apparatus, comprising:

a motor for rotating a disk-shaped storage medium;

a pickup for performing at least one of a write operation of writing information onto the storage medium and a read operation of reading information from the storage medium;

a pickup-moving device for moving the pickup between a center of rotation of the storage medium and an outer periphery of the storage medium;

a rotation controller for controlling a rotational speed of the storage medium based on a position of the pickup; and an overheat detector for detecting overheating of the pickup, wherein:

the pickup is cooled by using an airflow generated by the rotation of the storage medium; and when the overheat detector detects overheating of the pickup, the pickup-moving device moves the pickup toward the center of rotation of the storage medium and the rotation controller increases the rotational speed of the storage medium to perform an operation of increasing an efficiency of cooling the pickup.

24. A disk drive apparatus, comprising:

a motor for rotating a disk-shaped storage medium;

a pickup for performing at least one of a write operation of writing information onto the storage medium and a read operation of reading information from the storage medium;

a rotation controller for controlling a rotational speed of the storage medium;

a pickup-moving device for moving the pickup between a center of rotation of the storage medium and an outer periphery of the storage medium; and an overheat detector for detecting overheating of the pickup, wherein:

the pickup is cooled by using an airflow generated by the rotation of the storage medium; and when the overheat detector detects overheating of the pickup, an operation of increasing an efficiency of cooling the pickup by the airflow is performed.

* * * * *